United States Patent
Gong et al.

(10) Patent No.: US 12,266,034 B2
(45) Date of Patent: Apr. 1, 2025

(54) TECHNIQUES FOR ABSTRACT IMAGE GENERATION FROM MULTIMODAL INPUTS WITH CONTENT APPROPRIATENESS CONSIDERATIONS

(71) Applicant: Microsoft Technology Licensing, LLC, Redmond, WA (US)

(72) Inventors: Julia Gong, Cary, NC (US); Houdong Hu, Redmond, WA (US); William Douglas Guyman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 17/877,935

(22) Filed: Jul. 30, 2022

(65) Prior Publication Data
US 2024/0037810 A1   Feb. 1, 2024

(51) Int. Cl.
*G06T 11/00* (2006.01)
*G06F 16/53* (2019.01)
(Continued)

(52) U.S. Cl.
CPC .......... *G06T 11/001* (2013.01); *G06F 16/53* (2019.01); *G06F 16/5838* (2019.01);
(Continued)

(58) Field of Classification Search
CPC ....... G06T 11/001; G06T 7/0002; G06T 7/90; G06T 2207/10024; G06T 2207/20081;
(Continued)

(56) References Cited

U.S. PATENT DOCUMENTS

| | | | |
|---|---|---|---|
| 11,914,641 B2* | 2/2024 | Aggarwal | G06F 16/538 |
| 2010/0158412 A1 | 6/2010 | Wang et al. | |
| 2012/0163710 A1* | 6/2012 | Skaff | G06V 20/35 |
| | | | 382/165 |
| 2015/0378999 A1* | 12/2015 | Dorner | G06F 16/5838 |
| | | | 707/745 |

(Continued)

FOREIGN PATENT DOCUMENTS

| | | |
|---|---|---|
| CN | 109543159 A | 3/2019 |
| CN | 109271537 B | 11/2021 |

OTHER PUBLICATIONS

Tan, W. and Aguirre, H., "Improved ArtGAN for Conditional Synthesis of Natural Image and Artwork", IEEE Transactions on Image Processing, Aug. 22, 2018, 28(1), 394-409. (Year: 2018).*

(Continued)

*Primary Examiner* — Said Broome
*Assistant Examiner* — Donna J. Ricks
(74) *Attorney, Agent, or Firm* — NovoTechIP International PLLC

(57) ABSTRACT

A data processing system implements a receiving a textual input comprising a query for a first image. The data processing system also implements analyzing the textual input to determine a predicted color palette associated with a subject matter of the query; and procedurally generating the first image using the predicted color palette. Another implementation of the data processing system implements providing the textual input to a first machine learning model to obtain the first image, the first machine learning model being trained using a dataset comprising abstract imagery and analyzing the textual input using the first machine learning model to obtain the first image in response to receiving the textual input.

23 Claims, 21 Drawing Sheets

(51) Int. Cl.
  G06F 16/583  (2019.01)
  G06F 40/20  (2020.01)
  G06F 40/30  (2020.01)
  G06T 7/00  (2017.01)
  G06T 7/90  (2017.01)
(52) U.S. Cl.
  CPC .............. *G06F 40/20* (2020.01); *G06F 40/30* (2020.01); *G06T 7/0002* (2013.01); *G06T 7/90* (2017.01); *G06T 2207/10024* (2013.01); *G06T 2207/20081* (2013.01); *G06T 2207/20084* (2013.01)
(58) Field of Classification Search
  CPC ........... G06T 2207/20084; G06F 16/53; G06F 16/5838; G06F 40/20; G06F 40/30; G06F 16/54
  See application file for complete search history.

(56) References Cited

U.S. PATENT DOCUMENTS

| | | | | |
|---|---|---|---|---|
| 2022/0248090 | A1* | 8/2022 | Dhiman | H04N 21/4318 |
| 2022/0277435 | A1* | 9/2022 | Muthusamy | G06T 5/60 |
| 2023/0298224 | A1* | 9/2023 | Aggarwal | G06F 16/5838 382/162 |

OTHER PUBLICATIONS

40. Liu, V & Chilton, L.B. (Apr. 2022). "Design Guidelines for Prompt Engineering Text-to-Image Generative Models." In Proceedings of the 2022 CHI Conference on Human Factors in Computing Systems (pp. 1-23) (Year: 2022).*

Gong, Julia, "Generative Backgrounds Demo", Retrieved from: https://background-generator.azurewebsites.net/, Retrieved on: Jul. 7, 2022, 1 Page.

Bahng, et al., "Coloring with Words: Guiding Image Colorization Through Text-based Palette Generation", In Repository of arXiv:1804.04128v2, Aug. 7, 2018, 25 Pages.

Kleinholz, Jen, "How does the Wombo Dream App Work?", Retrieved from: https://www.sir-apfelot.de/en/how-does-the-wombo-dream-app-40092-work/, Mar. 1, 2022, 7 Pages.

Lendave, Vijaysinh, "FuseDream: A Hands-On Tutorial on This Text-to-Image Generation Tool", Retrieved from: https://analyticsindiamag.com/fusedream-a-hands-on-tutorial-on-this-text-to-image-generation-tool/, Dec. 15, 2021, 23 Pages.

Lu, Eric, "Our AI Art Generator Isn't Being Used To Generate Art", Retrieved from: https://www.kapwing.com/blog/our-ai-art-generator-isnt-being-used-to-generate-art/, Aug. 19, 2021, 9 Pages.

Poor, Austin, "Algorithmic Color Palettes", Retrieved from: https://towardsdatascience.com/algorithmic-color-palettes-a110d6448b5d, Oct. 14, 2020, 17 Pages.

Rakshit, Soumik, "PoE-GAN: Generating Images from Multi-Modal Inputs", Retrieved from: https://wandb.ai/geekyrakshit/poegan/reports/PoE-GAN-Generating-Images-from-Multi-Modal-Inputs-VmlldzoxNTA5MzUx, Feb. 25, 2022, 17 Pages.

Zhan, et al., "Multimodal Image Synthesis and Editing: A Survey", In Repository of arXiv:2112.13592v1, Dec. 27, 2021, 20 Pages.

"International Search Report and Written Opinion Issued in PCT Application No. PCT/US23/025496", Mailed Date: Sep. 6, 2023, 13 Pages.

* cited by examiner

TECHNIQUES FOR ABSTRACT IMAGE GENERATION FROM MULTIMODAL INPUTS WITH CONTENT APPROPRIATENESS CONSIDERATIONS

BACKGROUND

Content generation using artificial intelligence (AI) techniques has become increasingly popular. In particular, image generation methods have many applications, including but not limited to content creation, entertainment, and general consumption. State-of-the-art methods for image generation utilize deep learning neural networks to generate impressive results. However, in practice, using such machine learning models for image generation has several important drawbacks including: (1) lack of responsible AI; (2) data, licensing, and other legal issues, and (3) high latency. Responsible AI refers to the ability to ensure that the content generated by the machine learning model is appropriate and does not include potentially offensive content. Data, licenses, and other legal issues may arise when the machine learning model is trained using data subject to legal protection. A model trained on such data may incorporate elements of the protected content into the content generated by the model, which could subject a user utilizing this output to legal liability. Furthermore, current models have high latency, which precludes the use of these models in generating content in real-time applications. Hence, there is a need for improved systems and methods that provide a technical solution for generating imagery with content appropriateness ideas that avoid these and other such problems.

SUMMARY

An example data processing system according to the disclosure may include a processor and a machine-readable medium storing executable instructions. The instructions when executed cause the processor to perform operations including receiving a textual input comprising a query for a first image; analyzing the textual input to determine a predicted color palette associated with a subject matter of the query; and procedurally generating the first image using the predicted color palette by algorithmically generating the first image using a procedural generation algorithm that places limits on types of content including in the first image and a style of the first image.

An example data processing system according to the disclosure may include a processor and a machine-readable medium storing executable instructions. The instructions when executed cause the processor to perform operations including receiving a first input comprising a textual input, a sample image, or a multimodal input, the textual input comprising a query for a first image, the sample image comprising attributes similar to the first image, and the multimodal input comprising the textual input and the sample image; providing the first input to a first machine learning model as an input to obtain the first image, the first machine learning model being trained using a dataset comprising abstract imagery; and analyzing the first input using the first machine learning model to obtain the first image.

An example method implemented in a data processing system for generating images includes receiving a textual input comprising a query for a first image; analyzing the textual input to determine a predicted color palette associated with a subject matter of the query; and procedurally generating the first image using the predicted color palette by algorithmically generating the first image using a procedural generation algorithm that places limits on types of content including in the first image and a style of the first image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
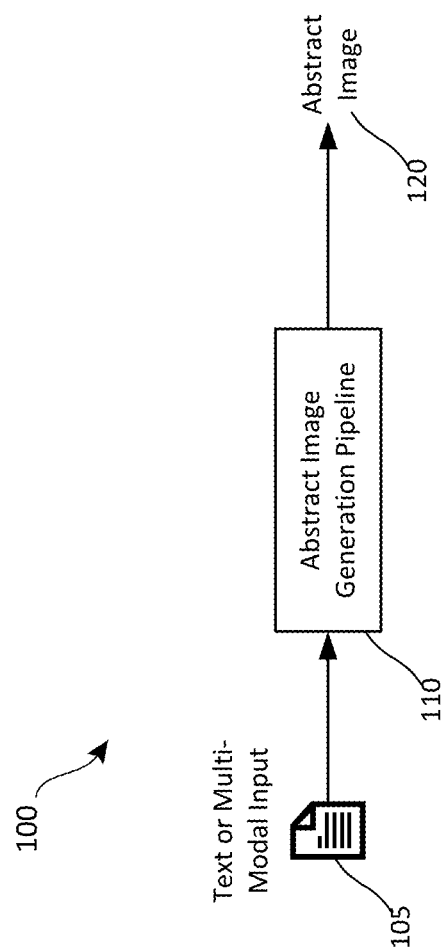
FIG. 1 is a diagram showing an example abstract image generation pipeline in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for generating abstract images with appropriateness considerations are provided. An abstract image is an image that does not include a representation of visual reality of people, animals, objects, features, or other aspects of the physical world and instead utilizes shapes, patterns, texture, and/or colors to achieve an effect. The techniques herein provide a technical solution to the technical problems associated with generating imagery using machine learning models that ensures that the content presented to a user is not offensive or otherwise inappropriate. These techniques also ensure that the abstract images produced do not violate any data protection, licensing, and/or other legal protections associated with the source data which may be used to train the machine learning models and may inadvertently be included in the imagery generated by the machine learning models. The techniques herein also provide a technical benefit of decreasing the latency associated with obtaining imagery from machine learning models typical of many deep learning models. Consequently, the techniques provided herein may be used with real-time applications in which an abstract image may be generated to satisfy timeliness constraints associated with the type of application in which the imagery is being utilized.

The techniques herein implement an abstract image generation pipeline that may be implemented on a computing device, implemented as part of the functionality of a cloud-based application, or implemented as a cloud-based service that generates images in response to requests for an abstract image. The image generation pipeline generates imagery in response to text-based inputs in some implementations and/or in response to multimodal inputs in other implementations. These multimodal inputs can include but are not limited to text, palette preference information identifying a preferred color palette and/or color palette size, sample imagery from which color palette information and/or stylistic information may be derived, perceptual constraint information for applying limits on the imagery being output, or a combination of one or more of such inputs. Some implementations of the abstract image generation pipeline use procedural generation techniques to generate the abstract imagery to provide appropriateness considerations, and one or more machine learning models are used to analyze the textual and/or multimodal inputs and to generate input parameters for the procedural generation techniques.

Procedural generation, as used herein, refers to a method of generating image data algorithmically as opposed to human-generated or machine-learning model generated image data. A procedural generation algorithm implements a set of actions for analyzing a textual input, a sample image, or multimodal input to determine features or attributes of the image data and for generating the image data based in part on those features. The procedural generation algorithm places limits on types of content including in the first image and a style of the first image. The procedural generation algorithms used to procedurally generate image data control various features or attributes of the image data that is generated, including but not limited to shapes, patterns, textures, and colors included in the image data. In some implementations, the procedural generation algorithms control a shape of brush strokes used to generate the image data, the geometry of shapes included in the image data, and/or other stylistic attributes of the image data generated by the procedural algorithm. This approach permits the procedural generation algorithms to mimic a particular artistic style in the abstract imagery generated. In some implementations, multiple algorithms for procedurally generating the image data are supported, and algorithm for generating the image data may be selected automatically from among the supported procedural generation algorithm or a particular algorithm may be selected based on a user input. In some implementations, the procedural generation algorithms may introduce a random or semi-random aspect into the generation of the abstract image data, so that two images generated using the same procedural generation algorithm and the same input would not be identical.

The techniques provided herein may utilize a variety of different types of image generation algorithms and are not limited to particular algorithm. In some implementations, the abstract image generation pipeline supports multiple procedural generation algorithms and may select an algorithm for generating an abstract image based on user-provided parameters, parameters derived from the query-text itself, perceptual constraints placed on the models used by the abstract image generation pipeline, or a combination there.

In some implementations, a machine learning model generates executable program code that is used to procedurally generate the abstract image rather than the machine learning model generating the abstract image directly. In such implementations, the machine learning model generates program code that procedurally generates the images. In some implementations, the executable program code is generated for each textual input, sample image, or multimodal input. In such implementations, the executable program code used to generate two images from the same input is different and the resulting images are also different. A technical benefit of this approach is that the various constraints discussed above can be applied to the code generation to ensure that the code generated by the model generates images that satisfy the user-provided and/or other constraints placed on the abstract image output by the abstract image generation pipeline. Another technical benefit of the procedural generation approach is that the machine learning models do not produce the abstract imagery that is provided to users, so the risk of producing an inappropriate image is reduced or eliminated. Other implementations utilize a machine learning model to generate the abstract imagery but place constraints on the training and/or output of the machine learning model to reduce the risk of the model generating inappropriate imagery.

Another technical benefit of the techniques provided herein is that the abstract image generation pipeline breaks generation of an abstract image into multiple stages. The actions performed at each stage are closely controlled and monitored to ensure that the appropriateness considerations are met. In contrast, systems that utilize machine learning models to generate imagery do not include such robust means for monitoring and controlling the model generation and what the model generates.

Another technical benefit of the techniques provided herein is that they may improve human computer interactions. The abstract image generating techniques herein may be used to generate imagery that may be utilized in various types of applications. The appropriateness considerations provided by these techniques ensure that the imagery generated and presented to a user of such an application will not be inappropriate or inoffensive. Furthermore, the techniques herein generate imagery in substantially real-time to permit the user to obtain imagery for use within the application without introducing significant delays that interrupt the user workflow. Consequently, these techniques significantly improve the user experience.

Another technical benefit of these techniques is the that the various machine learning models and/or procedural generation techniques utilized to generate the abstract imagery utilize models that are smaller and/or less complex than current state-of-the-art image generating models. Thus, the computing and/or memory resources required to generate the abstract images according to these techniques may be significantly less than approaches that utilize machine learning models. These and other technical benefits of the techniques disclosed herein will be evident from the discussion of the example implementations that follow.

FIG. 1 is a diagram showing an example computing environment 100 including an abstract image generation pipeline 110 in which the techniques disclosed herein may be implemented. The abstract image generation pipeline 110 may be implemented according to the techniques provided herein to receive a textual or multimodal input 105. The textual or multimodal input is provided by a user who would like to obtain an abstract image generated according to the parameters specified in the textual or multimodal input 105. In some instances, the user may provide a textual input that is analyzed by the image generation pipeline 110 to obtain an abstract image 120.

The textual input may be a structured textual input, such as a query formulated in a query language or markup language. In other implementations, the textual input may be unstructured textual content, such as a description of an abstract image that the user would like to obtain. The description may convey a mood or sentiment of the abstract image that the user would like to obtain from the abstract image generation pipeline 110. For example, the user might provide a textual input that states "a fun and relaxing day at the beach" or "a busy day at the office."

In other implementations, the multimodal inputs can include but are not limited to text, palette preference information identifying a preferred color palette and/or color palette size, sample imagery from which color palette information and/or stylistic information may be derived, perceptual constraint information for applying limits on the imagery being output, or a combination of one or more of such inputs. In addition to or instead of a textual input such as that described above, the input may include a preferred color palette and/or color palette size. The color palette information may be specified as a textual description, such as "blue and green" or "red, white, and blue" in some implementations. The color palette information may be specified as a set of numerical values representing one or more colors in a color model, such as but not limited to the RGB (red, green, blue) color model. The size of the color palette may be specified in some inputs. A smaller sized color palette may be desired in some implementations to limit the number of colors that are included in the abstract image 120 produced by the abstract image generation pipeline 110, while a larger sized color palette may be specified in to enable the abstract image generation pipeline 110 to generate an abstract image 120 that includes a wider variety of colors. The multimodal input 105 may include one or more sample images. In some implementations, the abstract image generation pipeline 110 extracts color palette information, palette size information, and/or stylistic information from the sample image or images. The stylistic information may influence the types of brush strokes, the geometry of shapes included in the abstract image 120, and/or other aspects of the look of the abstract image 120 generated by the abstract image generation pipeline 120. Additional details and example implementations of the abstract generation pipeline 110 are shown in the examples which follow.

Figure 2:
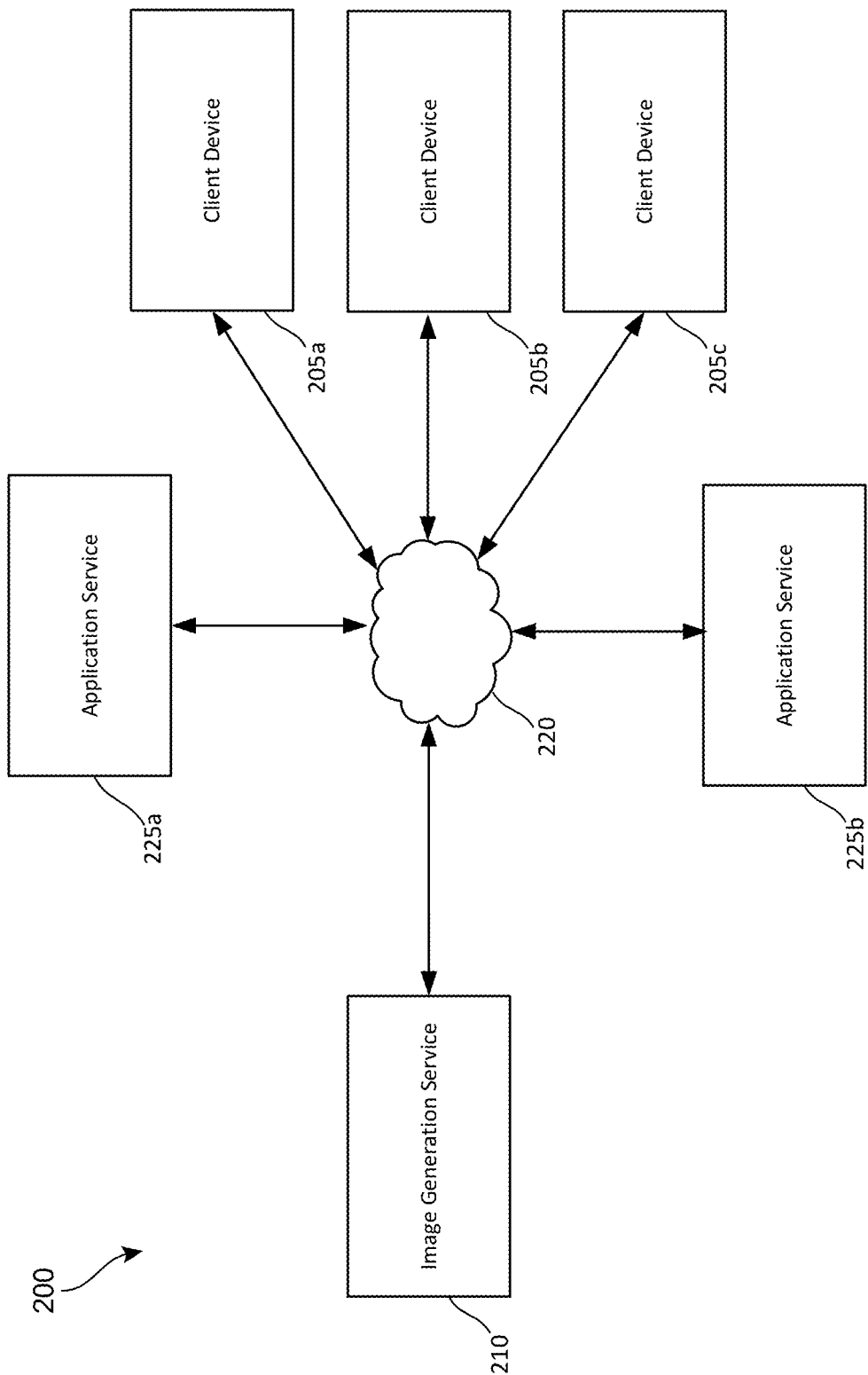
FIG. 2 is a diagram showing an example computing environment in which the techniques disclosed herein may be implemented.

FIG. 2 is a diagram showing an example computing environment 200 in which the techniques disclosed herein for generating abstract images with appropriateness considerations may be implemented. The computing environment 200 may include an image generation service 210. The example computing environment 200 may also include client devices 205a, 205b, and 205c (collectively referred to as client device 205) and application services 225a and 225b (collected to referred to as application service 225). The client devices 205a, 205b, and 205c may communicate with the image generation service 210 and/or the application service 225 via the network 220. The network 220 may be a combination of one or more public and/or private networks and may be implemented at least in part by the Internet.

In the example shown in FIG. 2, the image generation service 210 is implemented as a cloud-based service or set of services. The image generation service 210 receives a request for an abstract image from a client device 205 or an application service 225. The request may include the textual content and/or other multimodal content that may be provided as the textual or multimodal input 105 to the abstract image generation pipeline 110 implemented by the image generation service 210. The client device 205 or the application service 225 may receive the abstract image 120 from the image generation service 210 and integrate the abstract image 120 into an electronic document. In a non-limiting example, the abstract image 120 is obtained to be utilized as a background to a presentation slide or other electronic document being created or modified.

The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, spreadsheets, websites (e.g., SharePoint sites), digital drawings, media files, text and/or multimedia messages, or components thereof, and the like. In some implementations, the image generation service 210, or at least a portion of the functionality thereof, may be implemented by the application service 225 or the client device 205 to generate abstract images for users thereof.

The application services 225a and 225b may provide cloud-based software and services that are accessible to users via the client devices 205a, 205b, and 205c. The application services 225a and 225b may include various types of applications, such as but not limited to a communications platform and/or collaboration platform, a word processing application, a presentation design application, and/or other types of applications. The application services 225a and 225b may provide functionality for users to consume, create, share, collaborate on, and/or modify various types of electronic content, such as but not limited to textual content, imagery, presentation content, web-based content, forms and/or other structured electronic content, and other types of electronic content. The application services 225a and 225b may provide functionality for users to collaborate on the creation of the electronic content. The application services 225a and 225b may also provide a communications platform for users to communicate via email, text messages, audio and/or video streams as part of a communication session.

The application services 225a and 225b and/or the client devices 205a, 205b, and 205c may submit requests and textual or multimodal inputs to obtain abstract images to be presented to a user of the client devices 205a, 205b, and 205c. The requests may include information that identifies the user for whom the abstract images are to be provided to determine whether the user is authorized to use the services provided by the image generation service 210. The example implementations which follow demonstrate how these requests may be processed and the abstract images 120 generated by the image generation service 210 and presented on a user interface of the client devices 205a, 205b, and 205c.

The client devices 205a, 205b, and 205c are each a computing device that may be implemented as a portable electronic device, such as a mobile phone, a tablet computer, a laptop computer, a portable digital assistant device, a portable game console, and/or other such devices. The client devices 205a, 205b, and 205c may also be implemented in computing devices having other form factors, such as a desktop computer, vehicle onboard computing system, a kiosk, a point-of-sale system, a video game console, and/or other types of computing devices. While the example implementation illustrated in FIG. 2 includes three client devices, other implementations may include a different number of client devices that may utilize the application service 225 and/or the image generation service 210. Furthermore, in some implementations, the application functionality provided by the application service 225 may be implemented by a native application installed on the client devices 205a, 205b, and 205c, and the client devices 205a, 205b, and 205c may communicate directly with the image generation service 210 over a network connection.

In the example shown in FIG. 2, the image generation service 210 is shown as a cloud-based service that may be accessed over a network. However, other implementations of the image generation service 210 may be achieved by the application service 225 or by the client devices 205a, 205b, and 205c. In other implementations, the functionality of the image generation service 210 and/or the application service 225 described herein may be carried out on the client devices 205a, 205b, and 205c.

Figure 3:
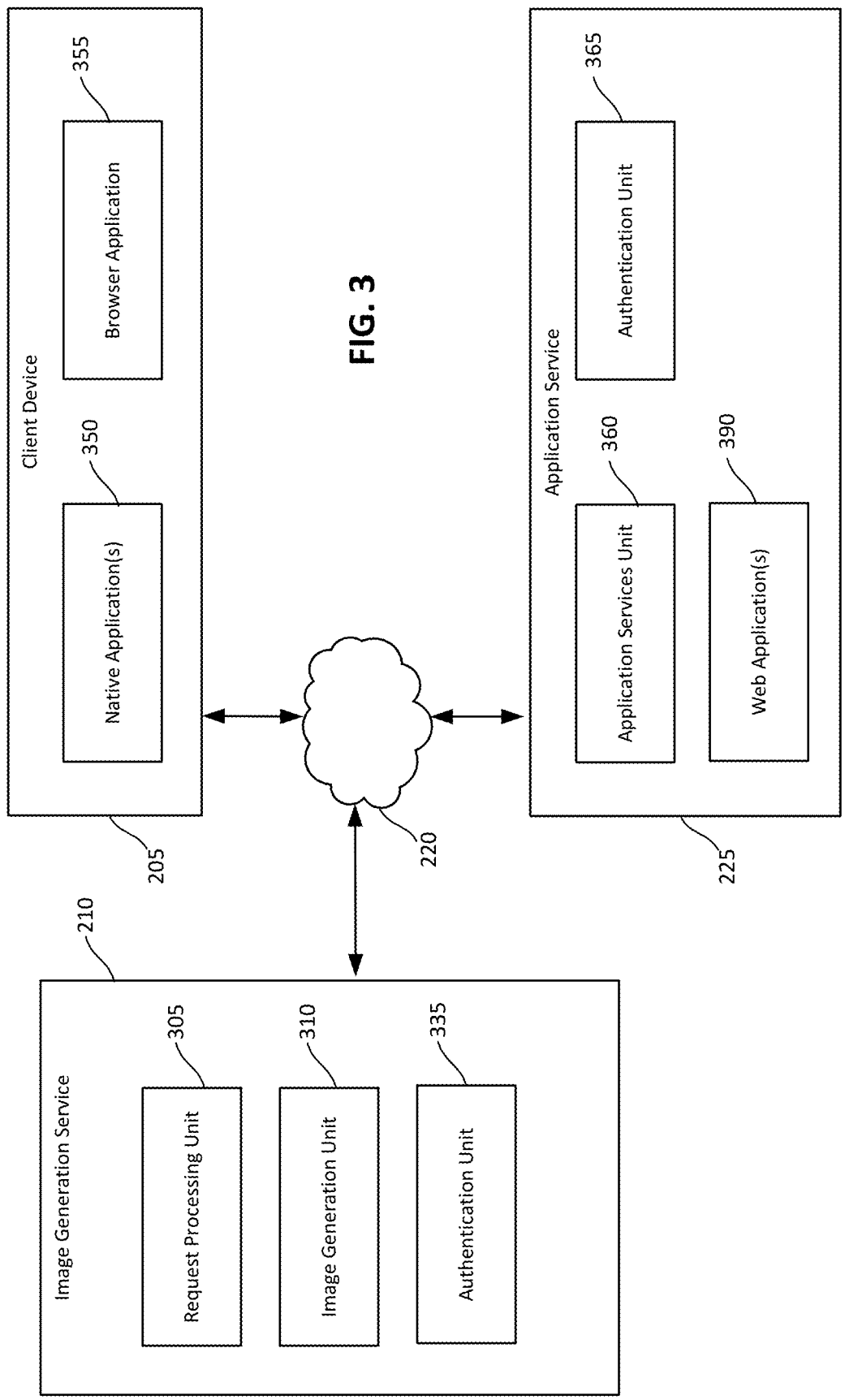
FIG. 3 is an example architecture that may be used, at least in part, to implement the client devices, the application services, and the image generation service shown in FIG. 2.

FIG. 3 is a diagram showing additional features of the image generation service 210, the client device 205, and the application service 225. This non-limiting example implementation of the image generation service 210 includes a request processing unit 305, an image generation unit 310, and an authentication unit 335.

The request processing unit 305 receives requests for abstract images. The request processing unit 305 obtains abstract images in response to such requests from the application service 225 or the client device 205. The abstract images obtained from the image generation service 110 may be presented to the user in a web browser, such as the browser application 355, or in a web-enabled native application, such as the native application 350, which may provide functionality for a user to access, modify, create, and/or otherwise consume multiple electronic documents and/or other content in a tabbed user interface. The request processing unit 305 can receive the textual and/or multimodal request parameters with the request. The request processing unit 305 provides the textual and/or multimodal request parameters received with the request to the image generation unit 310. The image generation unit 310 outputs the abstract image 120, and the request processing unit 305 provides the abstract image 120 to the client device 205 or the application service 225 that sent the request to the image generation service 210.

The image generation unit 310 implements the image generation pipeline 110 shown in FIG. 1. The image generation unit 310 provides the textual and/or multimodal request parameters received with the request for an abstract image as the textual or multimodal input 105 to the image generation pipeline 110. The image generation unit 310 performs preprocessing on the textual and/or multimodal request parameters in some implementations to convert the parameters to a format that may be received as an input by the one or more machine learning models used to implement the image generation pipeline 110. Example implementations of the image generation pipeline 110 are show in FIGS. 4-16, which are discussed in detail in the examples which follow.

The authentication unit 335 provides functionality for verifying whether users are permitted to access the services provided by the image generation service 210. In some implementations, the authentication unit 335 provides functionality for receiving authentication credentials for users from their respective client device 205 or from the application service 225. The authentication unit 335 verifies that the authentication credentials are valid and permit the users to access the services and/or documents provided by the image generation service 210 responsive to the authentication credentials being valid.

The application service 225 includes an application services unit 360 and/or an authentication unit 365. The application services unit 360 provides means for users to consume, create, share, collaborate on, and/or modify various types of electronic content. The application services unit 360 may provide a web-based interface to enable users to access at least a portion of the services provided by the application service 225. In other implementations, users may access the services provided by the application service 225 via one or more native applications 350. The application services unit 360 may in turn obtain the various readability services provided by the image generation service 210.

The authentication unit 365 may provide means for verifying whether users are permitted to access the services provided by the application service 225 and/or image generation service 210. The authentication unit 365 may provide means for receiving authentication credentials for the users from their respective client device 205. The authentication unit 365 verifies that the authentication credentials are valid and permits the users to access the services provided by the application service 225 and/or the image generation service 210 responsive to the authentication credentials being valid.

The client device 205 includes one or more native applications 350 and/or a browser application 355. The one or more native applications 350 include an application developed for use on the client device 205 and/or an application that may communicate with the application services 225a and 225b to enable users to consume, create, share, collaborate on, and/or modify electronic content. The browser application 355 may be an application for accessing and viewing web-based content. In some implementations, the application services 225a and 225b provide a web application 390 that enables users to consume, create, share, collaborate on, and/or modify content. A user of the client device 205 may access the web application 390 and render a user interface for interacting with the application services 225a and 225b in the browser application 355. The application services 225a and 225b and/or the image generation service 210 support both the one or more web-enabled native applications 350 and one or more web applications 390 in some implementations, and the users may choose which approach best suits their needs. The image generation service 210 provides support for the one or more native applications 350, the browser application 355, or both in some implementations to provide functionality for a user of the client device 205 to obtain the services provided by the image generation service 210.

FIGS. 4-16 show examples of various implementation of the abstract image generation pipeline 110. While some implementations shown in FIGS. 4-16 are shown receiving a textual input 105, these implementations are not limited to a textual input and may instead receive a multimodal input. The multimodal inputs can include but are not limited to text, palette preference information identifying a preferred color palette and/or color palette size, sample imagery from which color palette information and/or stylistic information may be derived, perceptual constraint information for applying limits on the imagery being output, or a combination of one or more of such inputs. Furthermore, the various units, models, and/or other components of the example implementations of the abstract image generation pipeline 110 shown in FIGS. 4-16 are not limited to textual inputs and are capable of receiving and processing a multimodal input in other implementations.

Figure 4:
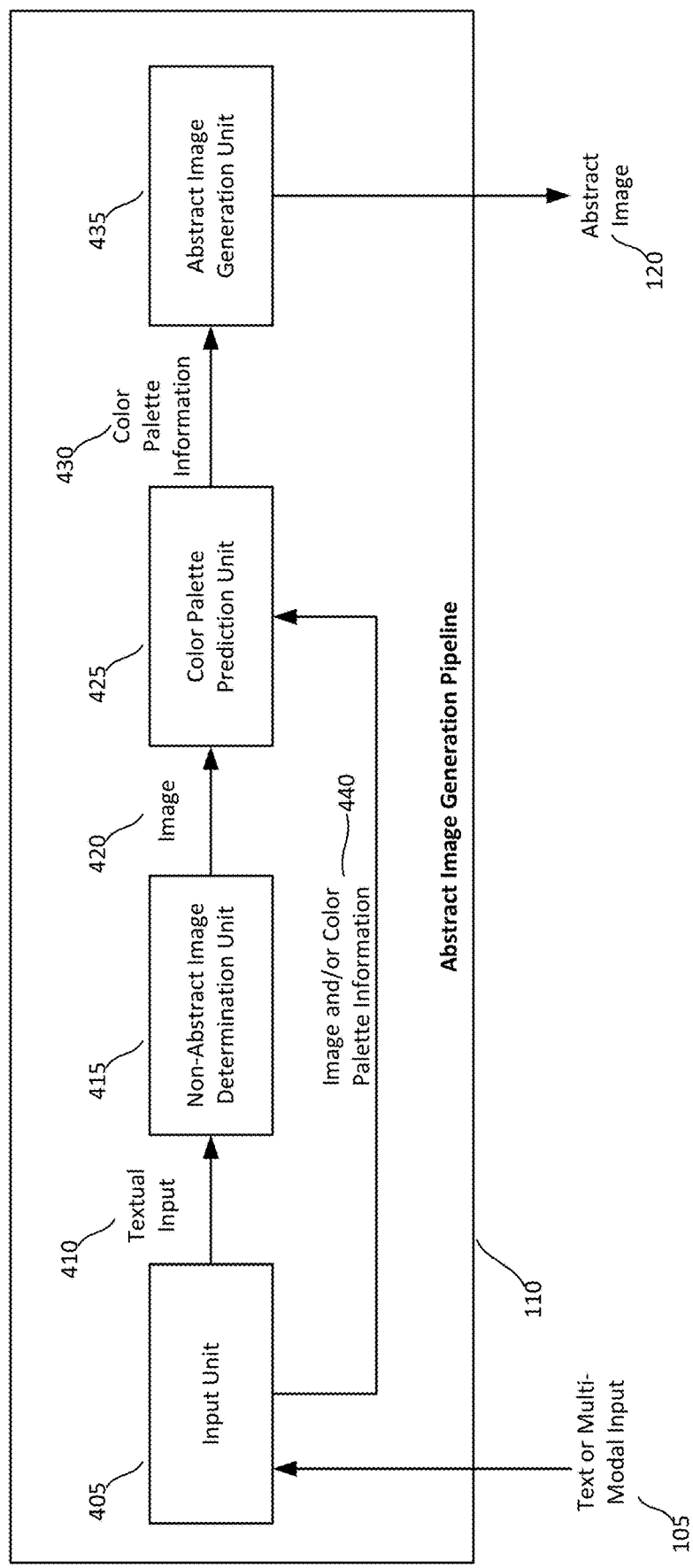
FIGS. 4, 5, 6A, 6B, 7, 8, 9, 10, 11, 12, 13, 14, 15, and 16 are example implementations of the abstract generation pipeline shown in FIG. 1.

FIG. 4 shows a non-limiting example implementation of the abstract image generation pipeline 110 shown in the preceding figures. In this example implementation, the abstract image generation pipeline 110 includes an input unit 405, a non-abstract image determination unit 415, a color palette prediction unit 425, and an abstract image generation unit 435.

The input unit 405 receives a textual or multimodal input 105. As discussed in the preceding examples, the textual or multimodal input 105 may include text, palette preference information identifying a preferred color palette and/or color palette size, sample imagery from which color palette information and/or stylistic information may be derived, perceptual constraint information for applying limits on the imagery being output, or a combination of one or more of such inputs. In some implementations, the input unit 405 reformats the textual and/or multimodal input into a format that may be utilized as input for one or more other units of the abstract image generation pipeline 110 and/or one or more machine learning models utilized by one or more the other units of the abstract image generation pipeline 110.

The input unit 405 provides textual input 410 derived from the text or multimodal input 105 as an input to the non-abstract image determination unit 415. In implementations where a textual input 105 is received by the abstract image generation pipeline 110, the input unit 405 provides a textual input 410 to the non-abstract determination unit 415 based on the textual input 105. The input unit 405 may reformat or otherwise process the textual input 105 to generate the textual input 410.

In some implementations, the non-abstract image determination unit 415 identifies one or more sample images based on the textual input 410. The non-abstract image determination unit 415 conducts a search of a datastore of images and/or a search of images available on one or more data sources on the Internet using a search engine. For example, the textual input may have included the text "a relaxing day at the beach," and the non-abstract image determination unit 415 may obtain one or more sample images related to the beach. The sample images may be photographs or realistic renderings of the physical world in contrast with the abstract image 120 which is output by the abstract image generation pipeline 110. In some implementations, the non-abstract image determination unit 415 uses a generative model to generate a non-abstract image based on the textual input 410. In some implementations, the non-abstract image determination unit 415 uses the generative model to generate a sample image if no sample imagery is obtained by searching for sample imagery. In yet other implementations, the non-abstract image determination unit 415 both conducts a search for imagery and generates one or more sample images using the generative model.

The sample image or images 420 are provided as an input to the color palette prediction unit 425. The color palette prediction unit 425 applies a palette extraction algorithm or palette extraction application to the sample image or images 420 provided as an input to the abstract image generation unit 435. The specific algorithm applied by the color palette prediction unit 425 may vary depending upon the specific implementation of the abstract image generation pipeline 110. The color palette information 430 output by the color palette prediction unit 425 is formatted according to a standard format expected as an input by the abstract generation unit 435 regardless of the format of the palette information output by the palette extraction algorithm applied by the color prediction unit 425.

In some implementations where the abstract image generation pipeline 110 receives a sample image, the input unit 405 is bypasses the non-abstract image determination unit 415 because the user has provided one or more sample images and/or color palette information 430 from which the color palette prediction unit 425 can use to determine the color palette information 430. The input unit 405 provides an image and/or color model information 440 to the color palette prediction unit 425. The input unit 405 bypasses the non-abstract image production unit 415 in instances where a multimodal input is provided that includes an image and/or color palette information 430. As discussed in the preceding examples, the abstract image generation pipeline 110 accepts images and/or color palette information 430 in some implementations that allow the user to specify a specific color palette 425 that indicates a color or set of colors that the user would like the abstract image 120 to include. In some implementations, the user may provide a sample image or sample images that represent a desired color palette that the user would like the abstract image 120 to include.

The color palette prediction unit 425 analyzes the image to extract color palette information 430 from the sample image or sample images included in the multimodal input. The color palette prediction unit 425 also utilizes palette size information, if such information is included with the multimodal input 115, to determine how many colors to include in the color palette information 430 output by the color palette prediction unit 425. In some implementations, the multimodal input 105 may include both color palette information and a sample image or images. In such implementations, the color palette prediction unit 425 analyzes the sample image or images to extract color palette information from the image or images as discussed above and combines the color palette extracted from the sample image or images with that of color palette information provided as input. In some implementations, the color palette prediction unit 425 outputs color palette information 430 that includes the colors extracted from the sample image or images with the colors of the color palette information provided with the multimodal input. In other implementations, the color palette prediction unit 425 may select a subset of the colors extracted from the sample image or images and/or the color palette information provided with the multimodal input 115 to output as the color palette information 430.

In some implementations, the color palette prediction unit 425 modifies the color palette extracted from the sample image or images and/or the color palette information provided with the multimodal input 115. The color palette extracted from the sample image and/or the color palette information provided with the multimodal input 115 provide a starting point for generating a color palette for the abstract image 120, but one or more colors of the palette may be modified. The color palette prediction unit 425 modifies one or more colors of the color palette and/or color palette information in various ways. In some implementations, the color palette prediction unit 425 selects a color modification technique from one of multiple techniques implemented by the color palette prediction unit 425. In some implementations, the color palette prediction unit 425 selects the modification technique based on the multimodal input 115. In some implementations, the color palette prediction unit 425 utilizes a machine learning model trained to modify the color palette and/or color palette information. In other implementations, the color palette prediction unit 425 randomly selects a color modification technique, use a round robin approach for selecting a color modification technique, or other such technique for selecting one of the color modification techniques implemented by the color palette prediction unit 425. In some implementations, the color palette prediction unit 425 supports a variety of color palette modification techniques included by applying various color scheme, such as but not limited to a monochromatic color scheme in which the colors of the color palette are associated with a single hue, an analogous color scheme in which a dominant color is paired with colors which are adjacent to the dominant color on a color wheel, a complementary color scheme in which a dominant color is paired with colors opposite the dominant color on the color wheel, a split complementary color scheme in which a dominant color and two colors directly adjacent to the colors complement opposite on the color wheel are selected. The color palette prediction unit 425 uses one or more of these color schemes to modify the color palette and/or color palette information provided to the abstract image generation unit 435 for generating the abstract image 120. The various implementations of the color palette prediction unit of the abstract image generation pipeline 110 may implement these color palette modifications in the examples which follow.

The abstract image generation unit 435 receives the color palette information 430 from the color palette prediction unit 425 and to generate the abstract image 120 based on the color palette information 430. The abstract image generation unit 435 generates the abstract image 120 procedurally in some implementations and using a machine learning model in other implementations. In the implementation in which the abstract image generation unit 435 utilizes a machine learning model to generate the abstract image 120, the abstract image generation unit 435 imposes various constraints on the machine learning model to provide appropriateness considerations regarding the content of the abstract image 120. Additional details of how the abstract image 120 may be generated are described in greater detail in the examples which follow.

Figure 5:
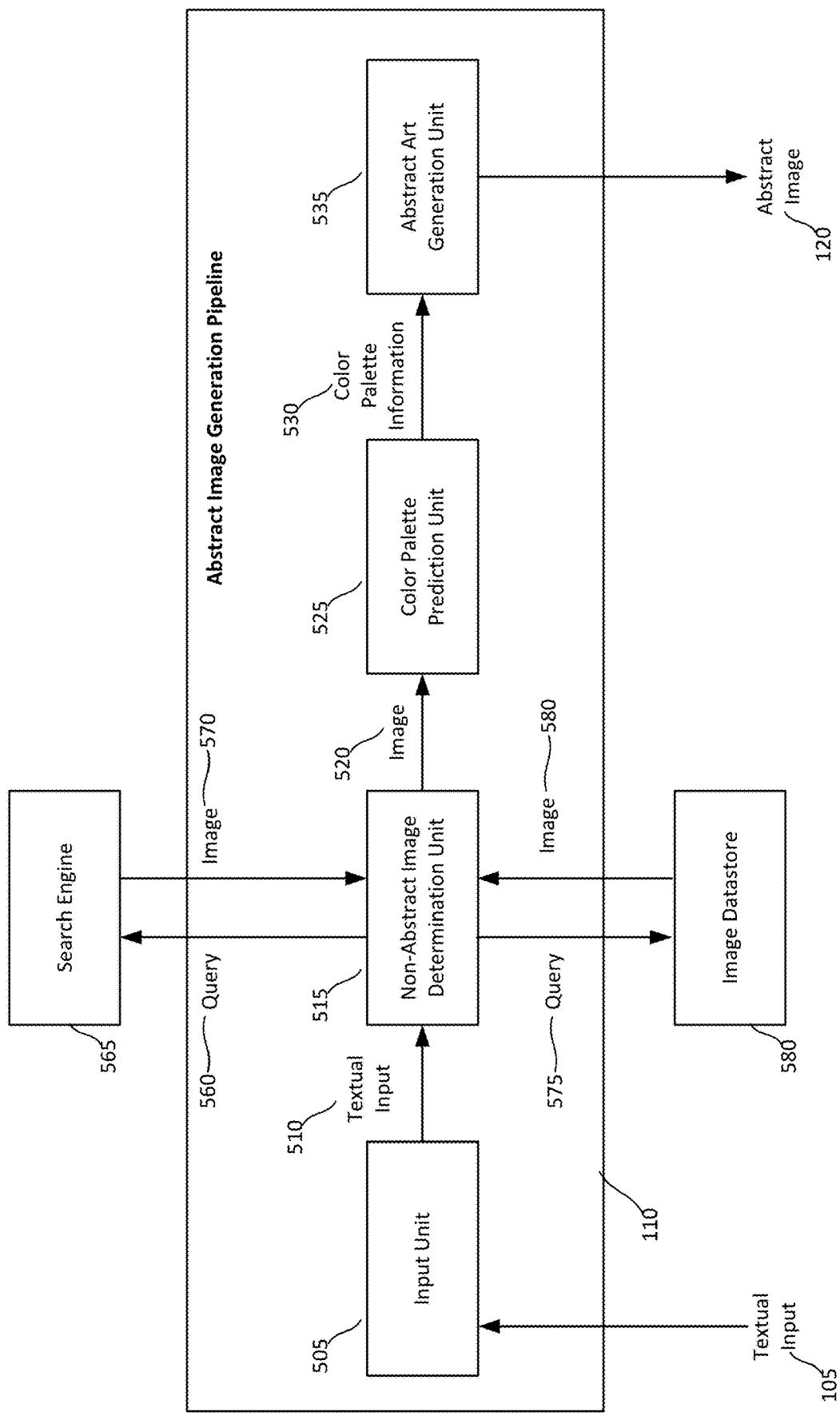

FIG. 5 shows another example of an implementation of the abstract image generation pipeline 110. In the example shown in FIG. 5, the abstract image generation pipeline 110 receives a textual input 105 but no additional information, such as palette information or sample imagery.

The input unit 505 operates similar to the input unit 405 discussed in the preceding example and outputs textual input 510 based on the textual input 105. The input unit 505 may reformat the text received into a query format that is expected by the non-abstract image determination unit 515. The non-abstract image determination unit 515 obtains a sample image or images based on the textual input 510 from an image datastore 580, a search engine 565, or both depending upon the specific implementation.

The search engine 565 is a software platform for searching for content on the Internet. The search engine 565 is Microsoft Bing® in some implementations. Other implementations may use a different search engine 565. The non-abstract image determination unit 515 submits a query 560 to the search engine 565, and the search engine provides an image or images 570 in response to the query. In instances in which the search engine 565 provides multiple images in response to the query 560, the non-abstract image determination unit 515 selects a subset of one or more images from the images provided to ensure that the number of images 520 provided to the color palette prediction unit 525 do not exceed the number of images that the color palette prediction unit 525 is capable of handling as an input.

The image datastore 580 is a persistent datastore that includes a set of non-abstract image data. The image datastore 580 may be a local or remote datastore that stores a set of non-abstract image data. The image datastore may be a set of photos associated with the user that may be stored locally on the computing device 205 of a user who submitted the query or may be stored on a cloud-based file sharing and/or storage platform, such as but not limited to Microsoft SharePoint®. In some implementations, the image datastore may be a set of images associated with an enterprise and the image datastore 580 may be stored on a network accessible to users associated with the enterprise. The image datastore 580 may provide one or more images 580 in response to the query 575. In instances in which the image datastore 580 provides multiple images in response to the query 575, the non-abstract image determination unit 515 selects a subset of one or more images from the images provided to ensure that the number of images 520 provided to the color palette prediction unit 525 do not exceed the number of images that the color palette prediction unit 525 is capable of handling as an input.

Figure 7:
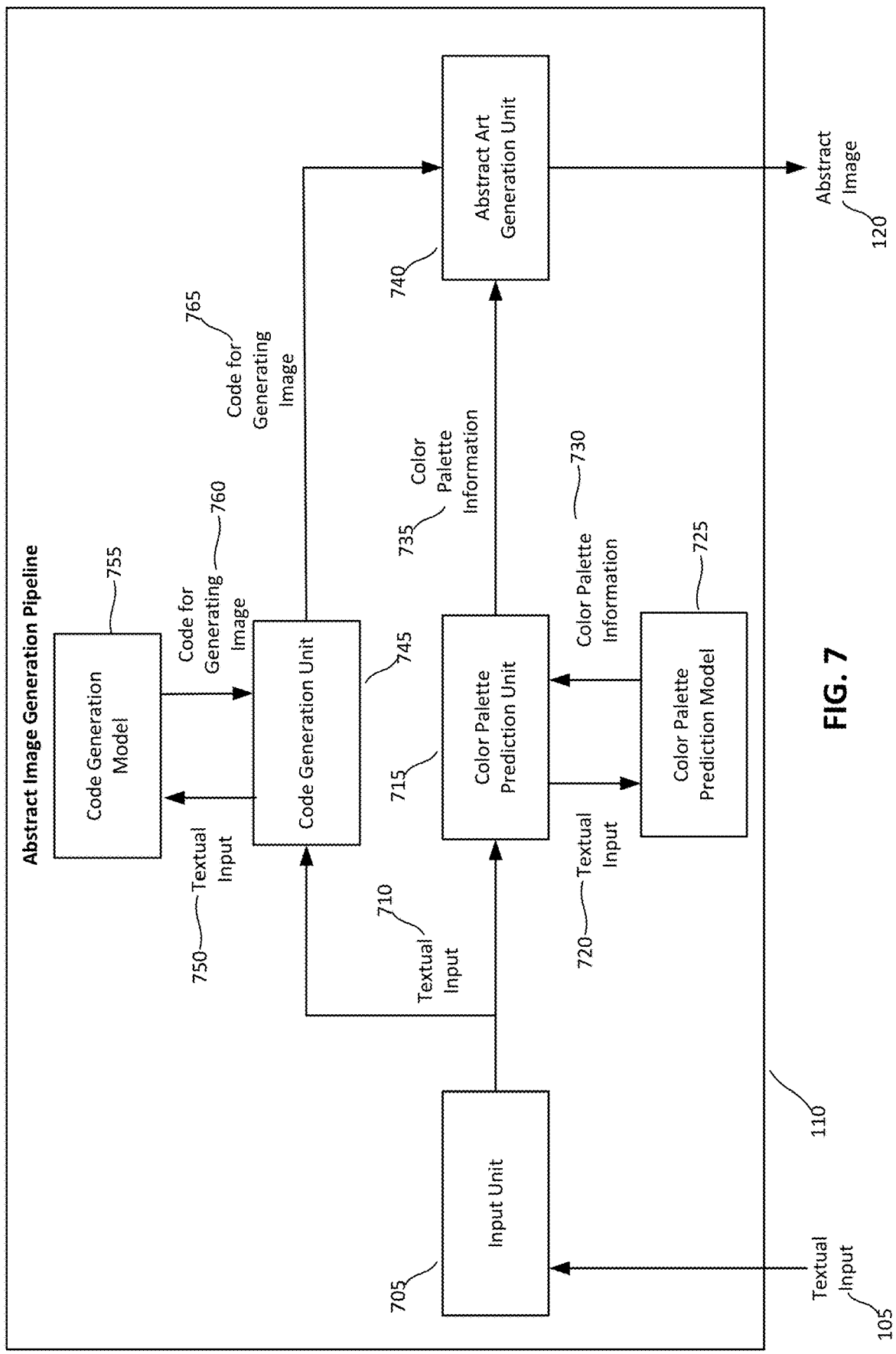
Figure 8:
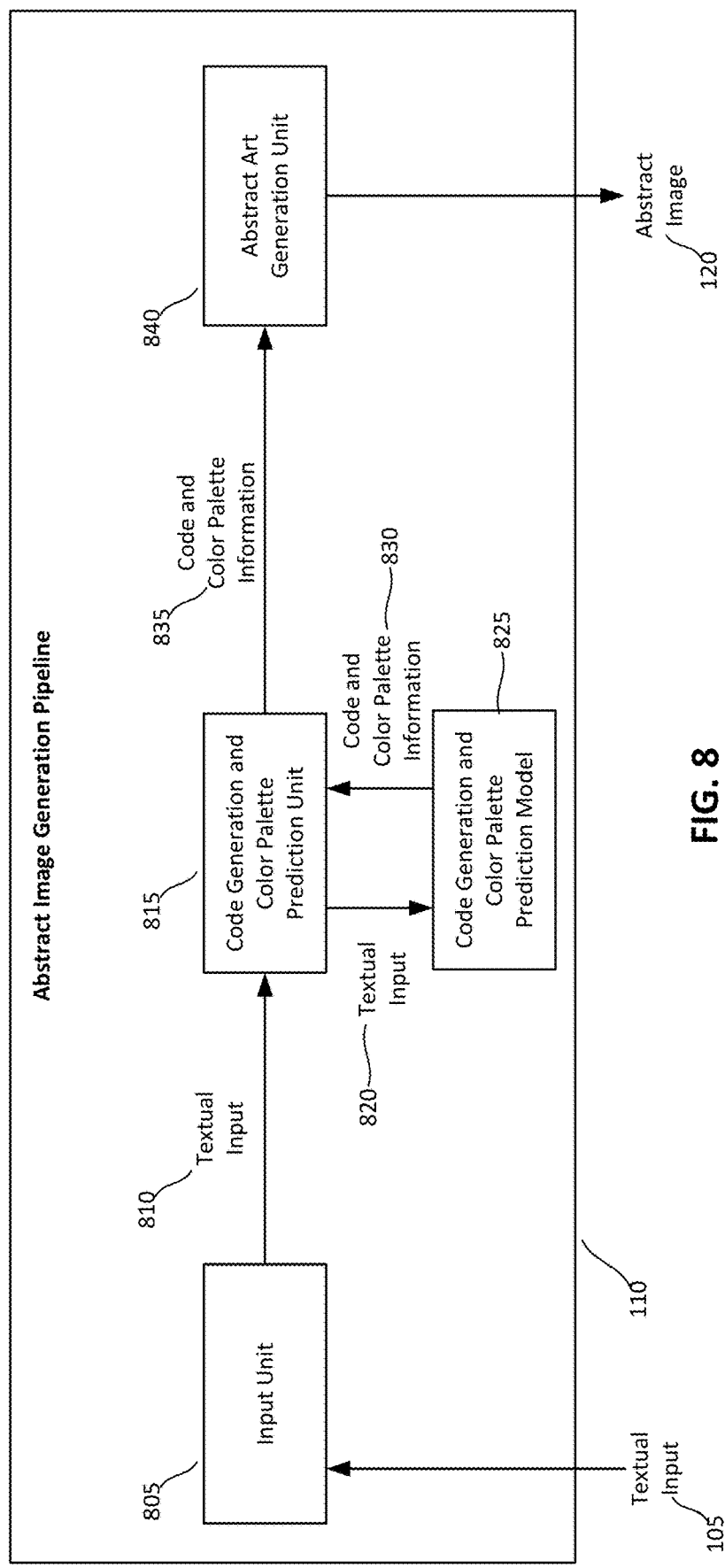
Figure 9:
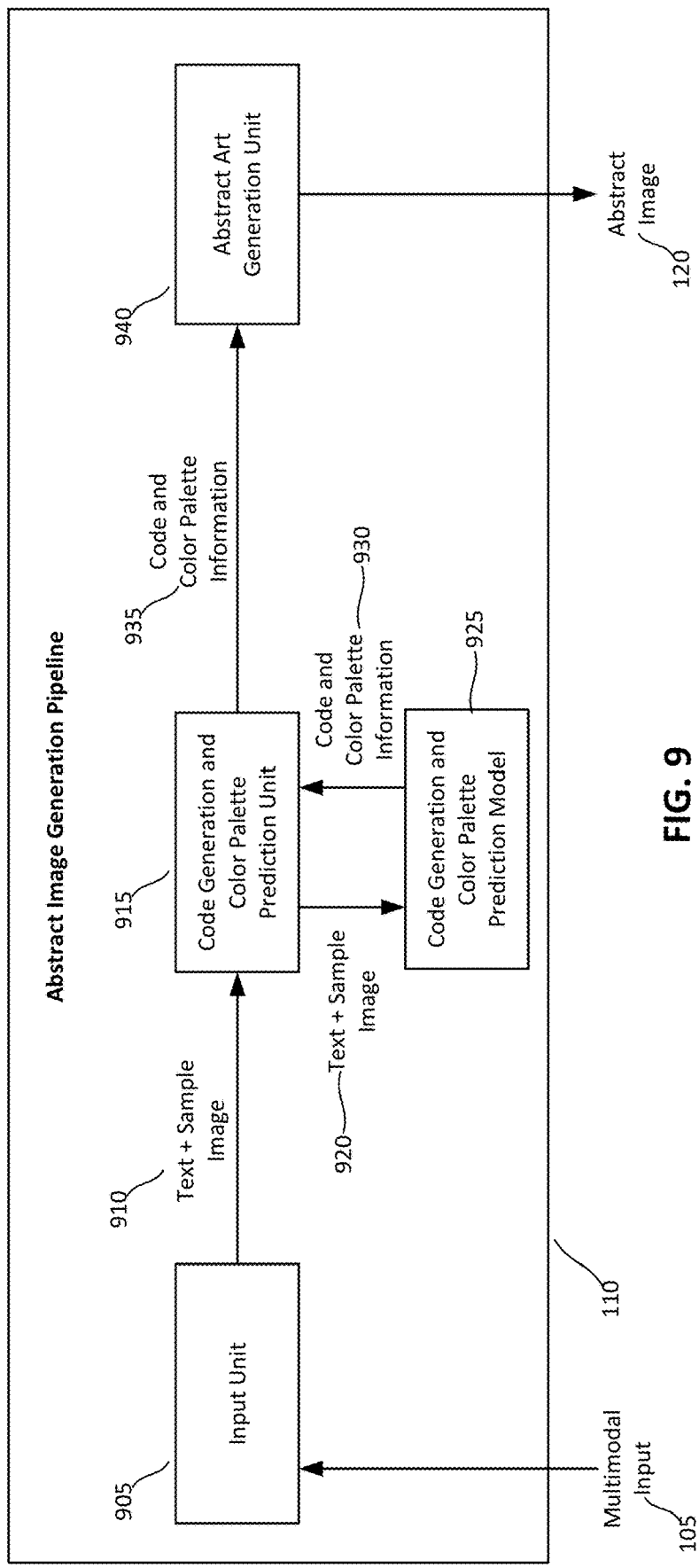
Figure 10:
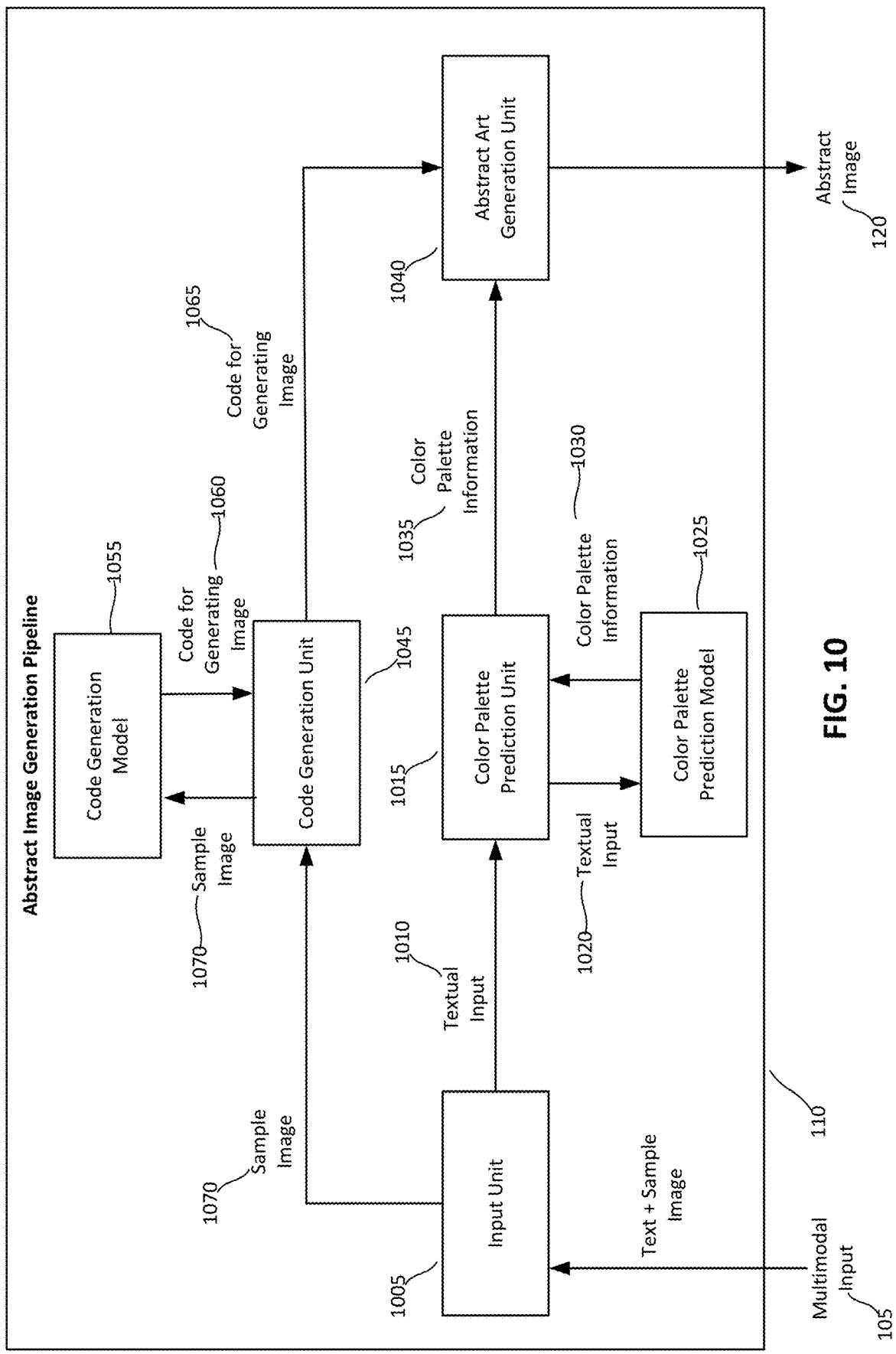

The color palette prediction unit 525 operates similar to the color palette prediction unit 425 shown in FIG. 4. The color palette prediction unit 525 outputs color palette information 530 which is similar to the color palette information 430. The abstract art generation unit 535 receives the color palette information 530 and to generate the abstract image 120 based on the color palette information 530. The abstract art generation unit 535 generates the abstract image 120 using a procedural generation technique which generates the abstract image 120 algorithmically. In some implementations, the abstract art generation unit 535 randomly selects an algorithm from a set of supported procedural generation algorithms to generation the abstract image 120. In other implementations, the selection of the algorithm may be based at least in part on stylistic attributes extracted from the query text (such an implementation is shown in FIGS. 7 and 8 as discussed below) or a sample image (such an implementation is shown in FIGS. 9 and 10 discussed below) or a multimodal input that includes both query text and at least one sample image. The query text and the sample image may be included in a multimodal input. In some implementations, the abstract image generation pipeline 110 generates code that implements the algorithm for procedurally generating the abstract image 120, and in some implementations the abstract image generation pipeline 110 uses a machine learning model to generate executable program code for procedurally generating the image. A technical benefit of using a procedural generation technique to generate the abstract image 120 based on the color palette information is that this approach ensures that the appropriateness considerations for the abstract image 120 are satisfied. The content of the abstract image 120 is completely controlled algorithmically and is not subject to the possibility of inappropriate or offensive content being inadvertently introduced in systems where such an image is generated by a machine learning model. A technical benefit of using such a procedurally generated approach is that the amount of computing and memory resources required to generate the abstract image 120 are significantly less than the computing and memory resources required to implement an instance of a deep learning model trained to generate images.

Figure 6A:
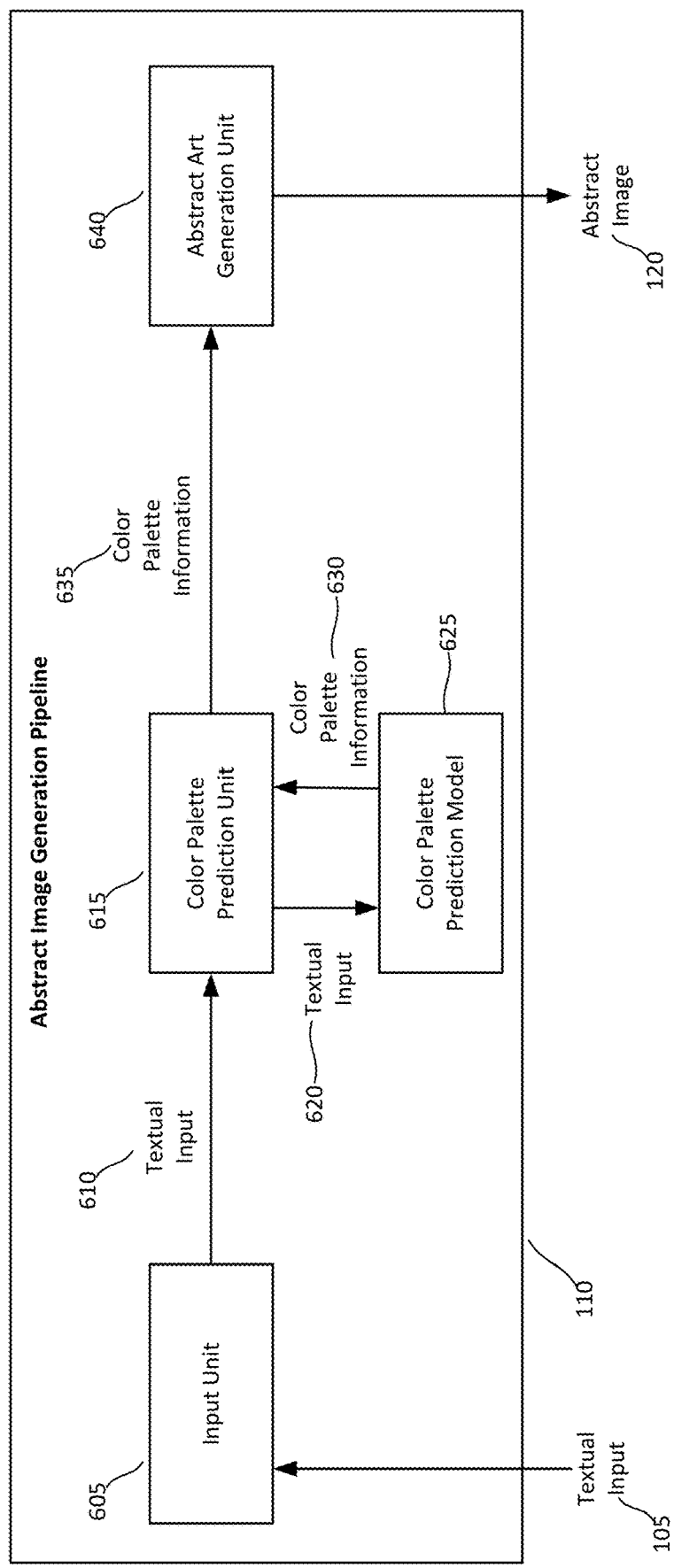
Figure 6B:
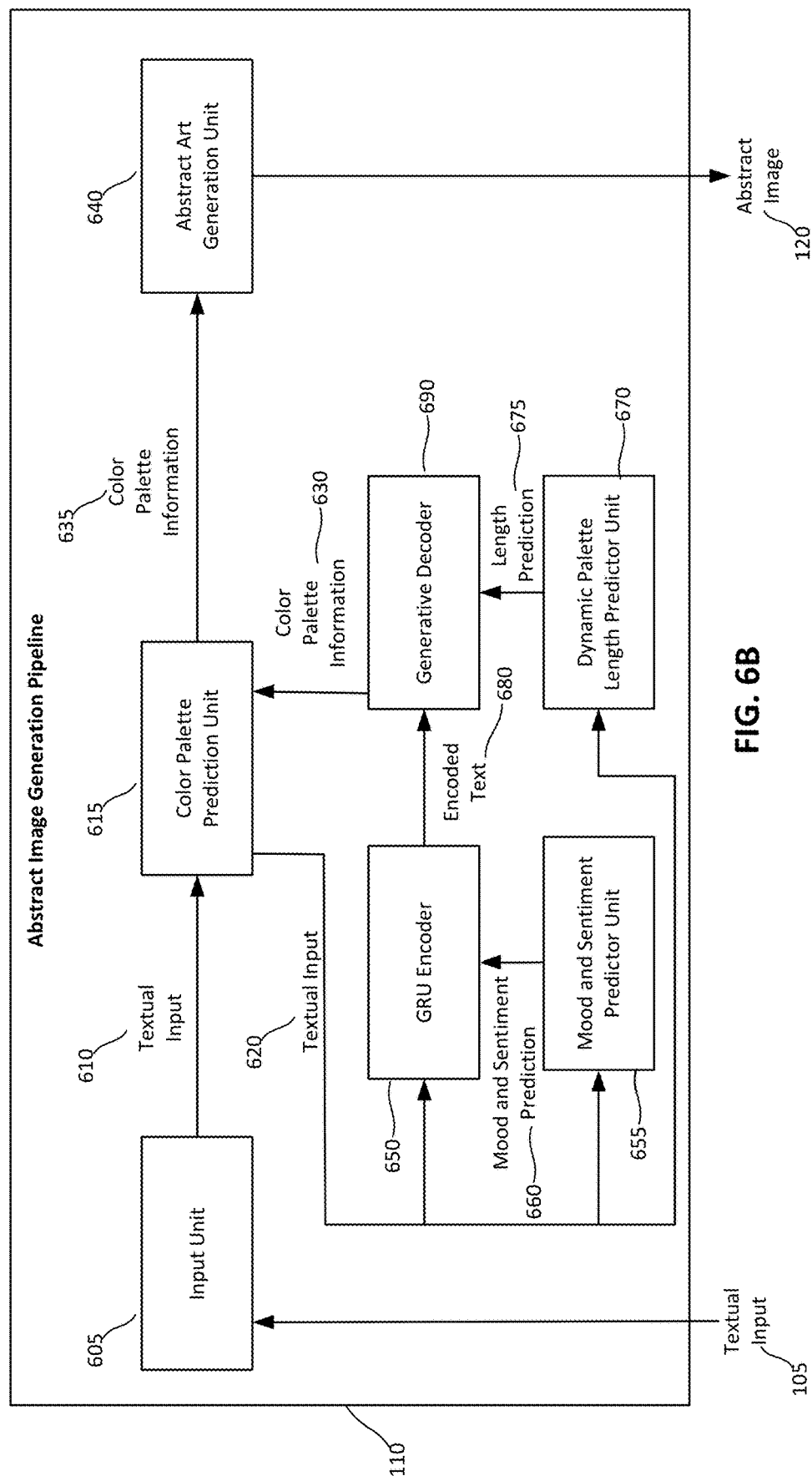

FIGS. 6A and 6B show additional examples of an implementations of the abstract image generation pipeline 110. FIGS. 6A and 6B show alternative possible implementations of the abstract image generation pipeline 110 that use a machine learning model trained to predict a color palette for the abstract image 120 based on the query text, a sample image, or a multimodal input rather than searching for and analyzing imagery to determine a color palette for the abstract image 120 as in the example implementation shown in FIG. 5.

The input unit 605 operates similarly to the input unit 505 shown in FIG. 5. The input unit 605 receives the textual input 105 and outputs the textual input 610 based on the textual input 105. The input unit 605 may reformat or perform other processing on the textual input 105 to produce the textual input 610. The textual input 610 is provided as an input to the color palette prediction unit 615. In implementations where the input is a sample image or multimodal input, the input unit 605 provides the sample image or the multimodal input to the color palette prediction unit 615. The input unit 605 may reformat or perform other processing on the sample image and/or components of the multimodal input. For example, the multimodal input may include a textual component and a sample image, and the input unit 605 may reformat or perform other processing on the textual component and/or the sample image.

The color palette prediction unit 615 provides the textual input 610 as a textual input 620 to the color palette prediction model 625. In implementations where the input is a sample image or multimodal input, the sample image or multimodal input is provided to the color prediction model 615 as an input. In implementations where the input is a textual input, the color prediction unit 615 may analyze the textual input 610 and convert the textual input 610 into textual input 620 which has a format that can be understood by the color palette prediction model 625. Similarly, where the input is a sample image or multimodal input, the color prediction unit 615 may analyze the sample image or multimodal input and convert the sample image and/or the components of the multimodal input into a format that can be understood by the color palette prediction model 625.

In some implementations, the color palette prediction model 625 is a machine learning model trained to receive a textual input 105 and to output predicted color palette information 630 for textual input 105. In other implementations, the color palette prediction model 625 is a machine learning model trained to receive a sample image or multimodal input and to output the predicted color palette information 630 for the sample image or the multimodal input. Some implementations may support more than one type of input, and the color palette prediction model 625 may be trained to receive and analyze more than one type of input to generate the predicted color palette information 630. In other implementations, multiple models may be trained to analyze the various types of inputs that may be received.

In some implementations in which a sample image or a multimodal input including a sample image is provided to the model, the color pallet prediction unit 615 is configured to analyze the image and generate a textual query representing the sample image. This textual query is then provided to the color palette prediction model 625 as an input or one of the inputs provided to the model.

In some implementations, the color palette prediction model 625 is implemented using various types of natural language processing (NLP) models trained to convert a text query into a color palette predicted to be relevant for such an input. In such implementations, the color palette prediction model 625 may be trained using training data derived from text and image pairs. The text represents query text that may be encountered by the color palette prediction model 625. In such implementations, the training images are analyzed using a color palette extraction algorithm to determine the color palette information for each image. The query text and the color palette information for each text and image pairs are then used to train the color palette prediction model 625. A technical benefit of this approach is that the abstract image 120 generated using this technique will satisfy the appropriateness guaranties associated with the abstract image generation pipeline 110. The color palette prediction model 625 is trained using training data that includes the query text and the color palette information derived from the images. No image data itself is generated by the color palette prediction model 625.

In other implementations, the color palette prediction model 625 may be a machine learning model that is configured to analyze a sample image received as the input or a sample image included as a component of a multimodal input and generate the color palette information for that sample image.

The color palette information 630 output by the color palette prediction model 625 is provided as input to the color palette prediction unit 615. The color palette prediction unit 615 may output this color palette information 630 directly as the color palette information 635 or perform processing on the color palette information 630 to generate the color palette information 635. In some implementations, the color palette prediction unit 615 may reformat the color palette information 630 output by the color palette prediction model 625 to a format that is suitable to be provided to the abstract art generation unit 640 as an input.

The abstract art generation unit 640 functions similarly to the abstract art generation unit 535 shown in FIG. 5. The abstract art generation unit 640 generates the abstract image 120 based on the color palette information 635. As discussed in the previous examples, the abstract art generation unit 640 may generate the abstract image 120 procedurally or use the color palette information 635 to apply color to the abstract image 120. Consequently, the content of the abstract image 120 is completely controlled algorithmically and is not subject to the possibility of inappropriate or offensive content being inadvertently introduced in systems where such an image is generated by a machine learning model. Furthermore, a technical benefit of this procedurally generated approach is that the amount of computing and memory resources required to generate the abstract image 120 should be significantly less than the computing and memory resources required to implement an instance of a deep learning model trained to generate images.

FIG. 6B provides another implementation of the abstract image generation pipeline 110 shown in FIG. 6A that provides additional features not included in the implementation shown in FIG. 6A. The example implementation shown in FIG. 6B utilizes a neural model that is trained to predict sequences of color palettes from text inputs. An example of a neural model trained to predict color palettes based on text queries is Text2Colors. Text2Colors consists of two conditional generative adversarial networks: (1) text-to-palette generation networks, and (2) palette-based colorization networks. The text-to-palette generation networks of Text2Colors performs reasonably well for short text inputs that clearly evoke color. For example, the text-to-palette generation networks of Text2Colors would perform reasonably well on a simple query, such as "pink sunset" or "pastel rainbow", but would struggle with more complex queries or queries that include semantic information, such as "taking a long sunset walk on the beach" or "proud fans at a basketball game." The implementation of the abstract image generation pipeline 110 shown in FIG. 6B includes a mood and sentiment predictor unit 655 that analyzes the textual inquiry and predict mood and/or sentiment information that provides additional semantic context for the model to consider when prediction the color palette for the query. Furthermore, the length of the color palette predicted by the text-to-palette generation networks of Text2Colors is limited to five colors. The implementation of the abstract image generation pipeline 110 shown in FIG. 6B includes a dynamic palette length predictor unit 670 that is trained to predict an appropriate number of colors to include in the color palette prediction output by the model. The implementation shown in FIG. 6B includes a mood and sentiment predictor unit 655 and a dynamic palette length predictor unit 670. Other implementations may include just the mood and sentiment predictor unit 655 or the dynamic palette length predictor unit 670. The color palette prediction model 625 shown in FIG. 6B is implemented using the gated recurrent unit (GRU) encoder 650, the mood and sentiment predictor unit 655, the generative decoder 690, and the dynamic palette length predictor unit 670.

The mood and sentiment predictor unit 655 is implemented using a machine learning model trained to analyze the textual input 620 representing the textual content of the query entered by a user and to output a mood and sentiment prediction 660. Mood as used herein represents a mental or emotional state conveyed by the textual input 620, such as but not limited to happiness, sadness, surprise, fear, frustration, or anger. Sentiment as used herein represents an emotional value assigned to the textual input 620, such as but not limited to positive, negative, or neutral. The mood and sentiment prediction 660 output by the mood and sentiment information predictor unit 655 is provided to the GRU encoder 650 as an input.

The GRU encoder 650 implements a recurrent neural network (RNN) that is trained to analyze the textual input 620 output by the color palette prediction unit 615 and the mood and sentiment prediction 660 output by the mood and sentiment predictor unit 655. The GRU encoder 650 encodes both the text input 620 representing the query entered by a user and the mood and sentiment prediction 660 to facilitate stronger semantic and abstract text queries. While the example implementation shown in FIG. 6B uses a GRU as the model architecture, other implementations may utilize other model architectures, such as but not limited to transformers, attention long short-term memory (LSTMs), and/or other model architectures.

The dynamic palette length predictor unit 670 analyzes the text input 620 and outputs a palette length prediction 675. The dynamic palette length predictor unit 670 utilizes a machine learning model trained to predict the palette complexity based on complexity of the query represented by the textual input 620. The length prediction 675 represents the number of colors to include in the color palette used to generate the abstract image 120. The length prediction 675 generated by the dynamic palette length predictor unit 670 also includes color diversity information suggesting a variety of colors to be used to generate the abstract image 120. The color diversity information specifies how many different colors are to be used to generate the abstract image 120. The number of colors is limited by the palette length. For example, the palette is limited to a maximum of five colors where the palette length is determined to be five. Where the color diversity is determined to be one color, but the palette length is greater than one, the color palette may include different tints or shades of a specific hue. The model used by the palette length predictor unit 670 may be trained using training data that associates query complexity with the palette length and color diversity. The dynamic palette length predictor unit 670 predicts the palette length and color diversity but does not select the colors to be included in the color palette. The generative decoder 690 selects the colors to include in the color palette used to generate the abstract image 120.

The generative decoder 690 analyzes the encoded text 680 and the palette length prediction 675 to generate the color palette information 630. The generative decoder 690 is a generative model that is conditioned to generate a palette of colors to be applied to the abstract image 120. The number of colors that the generative decoder 690 includes in the palette and the color diversity of these colors is determined based on the palette length prediction information 675 generated by the dynamic palette length predictor unit 670. The colors are selected based on the encoded text 680 which includes the mood and sentiment prediction information, which provides semantic context for the encoded text 680.

The abstract art generation unit 640 operates like the abstract art generation unit 640 shown in FIG. 6B. The abstract art generation unit 640 receives the color palette information 635 as an input and generates the abstract image 120.

The implementation of the abstract image generation pipeline 110 shown in FIG. 6B provides a technical solution to the limitations of the Text2Colors models including the poor performance of Text2Colors on complex queries and the static palette size of Text2Colors. The implementation shown in FIG. 6B addresses these issues by: (1) pairing a more comprehensive dataset with diverse, stronger semantic and abstract text queries with a modeling method that leverages a mood/sentiment prior to performing semantic associations to colors, and (2) dynamically predicting the palette size and color diversity based on the complexity of the text query. Furthermore, while the example implementation shown in FIG. 6B uses a GRU as the model architecture, other implementations may utilize other model architectures, such as but not limited to transformers, attention long short-term memory (LSTMs), and/or other model architectures.

FIG. 7 shows another example of an implementation of the abstract image generation pipeline 110. The implementation shown in FIG. 7 is like that shown in FIG. 6A but includes an additional model that generates executable code that is used to generate the abstract image 120.

The input unit 705 operates similarly to the input unit 605 shown in FIG. 6A. The input unit 705 receives the textual input 105 and outputs the textual input 710 based on the textual input 105. The input unit 705 may reformat or perform other processing on the textual input 105 to produce the textual input 710. The textual input 710 is provided as an input to the color palette prediction unit 715. As discussed in the preceding examples, the textual input 105 may include a user-provided query which provides characteristics of the abstract image 120 being requested.

The color palette prediction unit 715 operates similarly to the color palette prediction unit 615 shown in FIG. 6A. The color palette prediction unit 715 provides the textual input 710 as an input to the color palette prediction model 725. The color palette prediction model 725 is like the color palette prediction model 615 shown in FIG. 6A. The color palette prediction unit 715 outputs the color palette information 730 based on the textual input 720. The color palette information 730 output by the color palette prediction model 725 is provided as input to the color palette prediction unit 715. The color palette prediction unit 715 may output this color palette information 730 directly as the color palette information 735 or perform processing on the color palette information 730 to generate the color palette information 735. In some implementations, the color palette prediction unit 715 may reformat the color palette information 730 output by the color palette prediction model 725 to a format that is suitable to provide to the abstract art generation unit 740 as an input.

The input unit 705 also provides the textual input 710 to the code generation unit 745. The code generation unit 745 provides the textual input 750 as an input to the code generation model 755. The code generation unit 745 provides the textual input 710 to the code generation model 755 as the textual input 750 in some implementations. In other implementations, the code generation unit 745 reformats the textual input 710 to produce the textual input 750. The code generation model 755 is a machine learning model trained to generate code for generating the abstract image 120. The code is executable program code and/or a script that is executable by the abstract art generation unit 740. The specific format of the executable program code and/or script may vary depending upon the implementation. The code generation unit 745 outputs the code for generating the image 760 as code for generating the image 765 in some implementations. In other implementations, the code generation unit 745 formats and/or processes the code for generating the image 760 to generate the code 765 which is provided as an input to the abstract art generation unit 740.

The abstract art generation unit 740 receives the color palette information 735 and the code for generating the image 760. The abstract art generation unit 740 executes to procedurally generate the abstract image 120. A technical benefit of the approach shown in FIG. 7 is that the code generation module 755 can customize the style of the abstract image 120 based on text query. In some implementations, the code generation model 755 is trained to customize brush strokes, the geometry of shapes included in the abstract image 120, and/or other stylistic aspects of the abstract image 120.

The stylistic information may influence the types of brush strokes, visual effects, the geometry of shapes included in the abstract image 120, and/or other aspects of the look of the abstract image 120 generated by the abstract image generation pipeline 120. In some implementations, the code generation model 755 is trained to with training data that associates various example query text with specific styles of abstract image. The training data may also associate certain types of brush strokes, visual effects, the geometry of shapes included in the abstract image 120, and/or other aspects of the look of the abstract image 120 with specific examples of text query. Consequently, the code generation model 755 customizes the look of the abstract image 120 generated by the abstract art generation unit 740 by customizing the code used by the abstract art generation unit 740 to generate the abstract image 120. The abstract art generation unit 740 utilizes colors associated with the color palette information 735 to determine the coloration of the abstract image 120. A technical benefit of using a procedural generation technique to generate the abstract image 120 based on the code and the color palette information generated by the models is that this approach ensures that the appropriateness considerations for the abstract image 120 are satisfied. The image data is procedurally generated and there is no risk that inappropriate or offensive content may be generated.

FIG. 8 shows another example of an implementation of the abstract image generation pipeline 110. The example implementation shown in FIG. 8 is like that shown in FIG. 7 except a single machine learning model is used to generate both the color palette and the code for generating the abstract image 120.

The input unit 805 operates similarly to the input unit 705 shown in FIG. 7. The input unit 805 receives the textual input 105 and outputs the textual input 810 based on the textual input 105. The input unit 805 may reformat or perform other processing on the textual input 105 to produce the textual input 810. The textual input 810 is provided as an input to the code generation and color palette prediction unit 815. As discussed in the preceding examples, the textual input 105 may include a user-provided query which provides characteristics of the abstract image 120 being requested.

The code generation and color palette prediction unit 815 combines functionality like that of the color palette prediction unit 715 and the code generate unit 745 shown in FIG. 7. The code generation and color palette prediction unit 815 provides the textual input 820 to the code generation and color palette prediction model 825. The code generation and color palette prediction unit 815 reformats the textual input 810 in some implementations to generate the textual input 820. In other implementations, the code generation and color palette prediction model 815 provides the textual input 810 to the code generation and color palette prediction model 825 as the textual input 820 without reformatting or otherwise processing the textual input 810.

The code generation and color palette prediction model 825 combines the functionality of the code generation model 755 and the color palette prediction model 725 shown in FIG. 7. The code generation and color palette prediction model 825 output a code and color palette information 830 that includes both the code to generate the abstract image 120 and the color palette information used to determine the coloration of the abstract image 120. The code generation and color palette prediction unit 815 may reformat or otherwise process the code and color palette information 830 to generate the code and color palette information 835. In other implementations, the code generation and color palette prediction unit 815 provides the code and color palette information 830 to the abstract art generation unit 840 without reformatting or otherwise processing the code and color palette information 830.

The abstract art generation unit 840 operates like the abstract art generation unit 740 shown in FIG. 7. The abstract art generation unit 840 receives the code and color palette information 835 and the code for generating the abstract image 120. A technical benefit of the approach shown in FIG. 8 is that this approach may reduce the computing and/or memory resources required to generate the code for generating the abstract image 120 and the color palette used to determine the coloration of the image, because multiple instances of machine learning models do not need to be instantiated by the abstract image generation pipeline 110.

FIG. 9 shows another example of an implementation of the abstract image generation pipeline 110. The example implementation shown in FIG. 9 is like that shown in FIG. 8 except a multimodal input including text and a sample image is used for generating the abstract image 120.

The input unit 905 operates like the input unit 805 shown in FIG. 8. The code generation and color palette prediction unit 915 operates similarly to the code generation and color palette prediction unit 815 shown in FIG. 8. The code generation and color palette prediction model 925 operates similarly to the code generation and color palette prediction model 825. The abstract art generation unit 940 operates similarly to the abstract art generation unit 840 shown in FIG. 8.

The input 105 in the example shown in FIG. 9 is a multimodal input that includes a textual query as in the previous example and at least one sample image. The sample image is analyzed by the code generation and color palette prediction model 925 to analyze the sample image to extract stylistic information from the sample image for generating the code to be used by the abstract art generation unit 940. The code generation and color palette prediction model 925 analyzes the brush strokes, visual effects, the geometry of shapes included in the abstract image 120, and/or other aspects of the sample image and generates code to create the abstract image 120 with similar attributes as the sample image. The code generation and color palette prediction model 925 generates a color palette to be applied to the abstract image 120. The code generation and color palette prediction model 925 outputs the code and color palette information 930. The code generation and color palette prediction unit 915 may output the code and color palette information 930 without modification as the code and color palette information 935 or may reformat or otherwise process the code and color palette information 930 to generate the code and color palette information 935.

The abstract art generation unit 940 operates similarly to the abstract art generation unit 840 shown in FIG. 8. The abstract art generation unit 940 generates the abstract image 120 using the code and the palette information generated by the code generation and color palette prediction model 925. A technical benefit of the approach shown in FIG. 9 is that the sample image or images provided with the multimodal input 105 is only used to extract stylistic attributes to be applied to the abstract image 120. This ensures that the appropriateness considerations for the abstract image 120 are satisfied. The image data is procedurally generated according to the style of the sample image and there is no risk that inappropriate or offensive content may be generated.

FIG. 10 shows another example of an implementation of the abstract image generation pipeline 110. The example implementation shown in FIG. 10 includes separate models for generating the code used to generate the abstract image 120 and for generating the color palette to be applied to the abstract image 120. This approach is like the example implementation of the abstract image generation pipeline 110 shown in FIG. 7.

The input unit 1005 operates similarly to the input unit 705 shown in FIG. 7 except the input unit 1005 receives a multimodal input that includes at least one sample image. The input unit 1005 receives the multimodal input 105 and provides the textual input 1010 to the color pallet prediction unit 1015 and the one or more sample images 1070 to the code generation unit 1045. As discussed in the preceding examples, the textual input 1010 may include a user-provided query which provides characteristics of the color palette abstract image 120 being requested. The sample image or images are provided as samples of the stylistic attributes to be applied to the abstract image 120.

The code generation unit 1045 operates similarly to the code generation unit 745 but the code is instead generated based on the attributes of the sample image 1070. The code generation unit 1045 provides the sample image 1070 to the code generation model 1055 as an input. The code generation model 1055 is trained to generate code that is used by the abstract art generation unit 1040 to generate the abstract image 120. The code is executable program code and/or a script that is executable by the abstract art generation unit 1040. The specific format of the executable program code and/or script may vary depending upon the implementation. The code generation unit 1045 outputs the code for generating the image 1060 as code for generating the image 1065 in some implementations. In other implementations, the code generation unit 1045 formats and/or processes the code for generating the image 1060 to generate the code 1065 which is provided as an input to the abstract art generation unit 1040.

The color palette prediction unit 1015 operates similarly to the color palette prediction unit 715 shown in FIG. 7. The color palette prediction unit 1015 provides the textual input 1010 as an input to the color palette prediction model 1025. The color palette prediction model 1025 is like the color palette prediction model 1015 shown in FIG. 7. The color palette prediction unit 1015 outputs the color palette information 1030 based on the textual input 1020. The color palette information 1030 output by the color palette prediction model 1025 is provided as input to the color palette prediction unit 1015. The color palette prediction unit 1015 may output this color palette information 1030 directly as the color palette information 1035 or perform processing on the color palette information 1030 to generate the color palette information 1035. In some implementations, the color palette prediction unit 1015 may reformat the color palette information 1030 output by the color palette prediction model 1025 to a format that is suitable to provide to the abstract art generation unit 1040 as an input.

The abstract art generation unit 1040 operates similarly to the abstract art generation unit 740 shown in FIG. 7. The abstract art generation unit 1040 utilizes the code generated by the code generation model 1055 and the color palette information generated by the color palette prediction model 1025 to generate the abstract image 120. As discussed with respect to the preceding example implementations, a technical benefit of the approach shown in FIG. 9 is that the sample image or images provided with the multimodal input 105 is only used to extract stylistic attributes to be applied to the abstract image 120.

Figure 11:
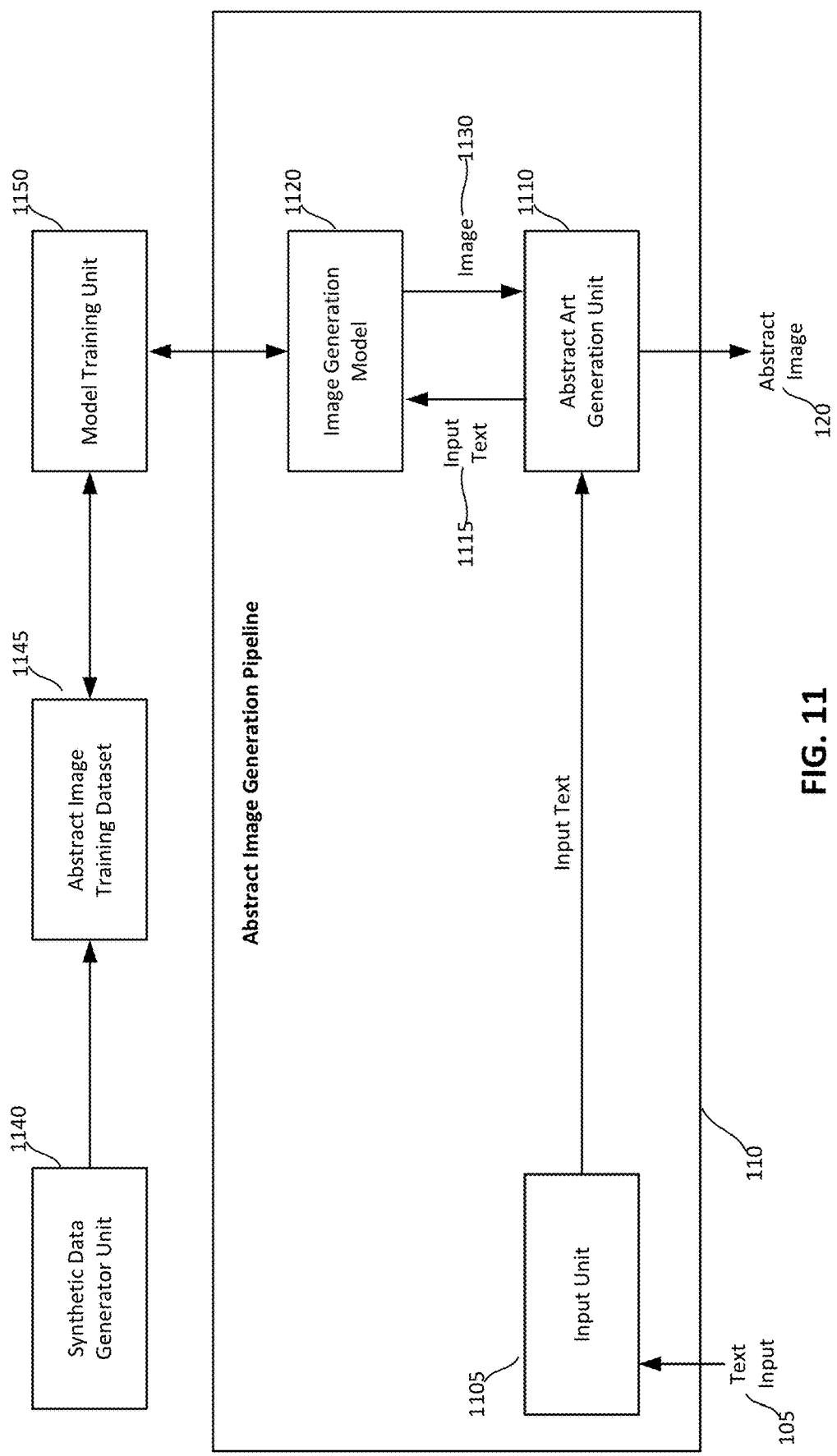

FIG. 11 shows another example of an implementation of the abstract image generation pipeline 110. The example implementation of the abstract image generation pipeline 110 shown in FIG. 11 uses a different approach to generate the abstract image 120 than the example implementations of the abstract image generation pipeline 110 shown in FIGS. 5-10. In the example implementations shown in FIGS. 5-10, the abstract image 120 is generated procedurally. In contrast, in the example implementation shown in FIG. 11, the abstract image 120 is generated using an image generation machine learning model. The approach shown in FIG. 11 places constraints on the training and/or output of the machine learning model to reduce the risk of the model generating inappropriate or offensive imagery.

The input unit 1105 receives a textual input 105. As in the previous examples, the textual input includes query text provided by a user. The input unit 1105 provides the textual input 105 to the abstract art generation unit 1110 as an input 1115. The input unit 1105 may format the textual input 105 to a format expected by the abstract art generation unit 1110 as an input. In other implementations, the input unit 1105 receives a sample image an input instead of the textual input. In yet other implementations, the input unit 1105 receives a multimodal input, which may include but is not limited to a textual input and a sample image.

The abstract art generation unit 1110 provides the input text 1115 to the image generation model 1120. The image generation model 1120 is a text-to-image machine learning model that has been trained on an abstract image training dataset 1145. The image generation model 1120 is a conventional natural language text-to-image machine learning model that outputs an image 1130 in response to receiving the input text 1115 as an input. The abstract art generation unit 1110 outputs the image 1130 output by the image generation model 1120 as the abstract image 120. In some implementations, the image generation model 1120 may be a relatively smaller, more lightweight version of a neural model. In some implementations, the lightweight model DALL-E mini is used to implement the image generation model 1120. Other implementations may utilize other such lightweight versions of models. A technical benefit of using such a lightweight model is reduced latency in generating the abstract image 120. The usage of such a model may permit the abstract image generation pipeline 110 to satisfy timeliness constraints associated with a particular application that is consuming the abstract images output by abstract image generation pipeline 110. Another technical benefit of using such a lightweight model is that such models require less computing and memory resources to support an instance of such a model compared to the larger full scale, state of the art neural models that may be used to implement the image generation model 1120.

In other implementations, the abstract art generation unit 1110 is not limited to a text-to-image model. In such implementations, the abstract art generation unit 1110 receives a sample image or multimodal input and provides the sample image or multimodal input as an input to the image generation model 1120. In such implementations, the image generation model 1120 is trained to receive the sample image or multimodal input. The image generation model 1120 is trained to generate an output image based on this input and outputs an image 1130 in response to receiving the input text 1115 as an input. As in other implementations, the abstract art generation unit 1110 outputs the image 1130 output by the image generation model 1120 as the abstract image 120.

The abstract image training dataset 1145 is developed offline before the abstract image generation pipeline 110 is deployed. In some implementations, the abstract image training dataset 1145 includes text-image abstract data pairs in implementations in which a textual input or multimodal input including textual input is received. The text represents an example user query and/or a query derived from sample imagery where the input includes such a sample image. The image of the text-image pair is an abstract image generated by the synthetic data generator unit 1140 for that user query. The synthetic data generator unit 1140 may be implemented using one of the abstract image generation pipeline 110 implementations shown in the preceding examples. The synthetic data generator unit 1140 generates an abstract image for a set of example user queries and stores the abstract image 120 resulting from each of these example user queries as text-image data pairs in the abstract image training dataset 1145. The model training unit 1150 uses this abstract image training dataset 1145 to train the image generation model 1120. A technical benefit of this approach is that the image generation model 1120 is trained using abstract images. Consequently, the abstract image 120 output by the abstract image generation pipeline 110 is unlikely to include inappropriate or offensive content. Training the model using abstract imagery significantly reduces the chances that the model may inadvertently generate inappropriate or offensive content in contrast with models which have been trained using large image datasets which may include non-abstract imagery.

Figure 12:
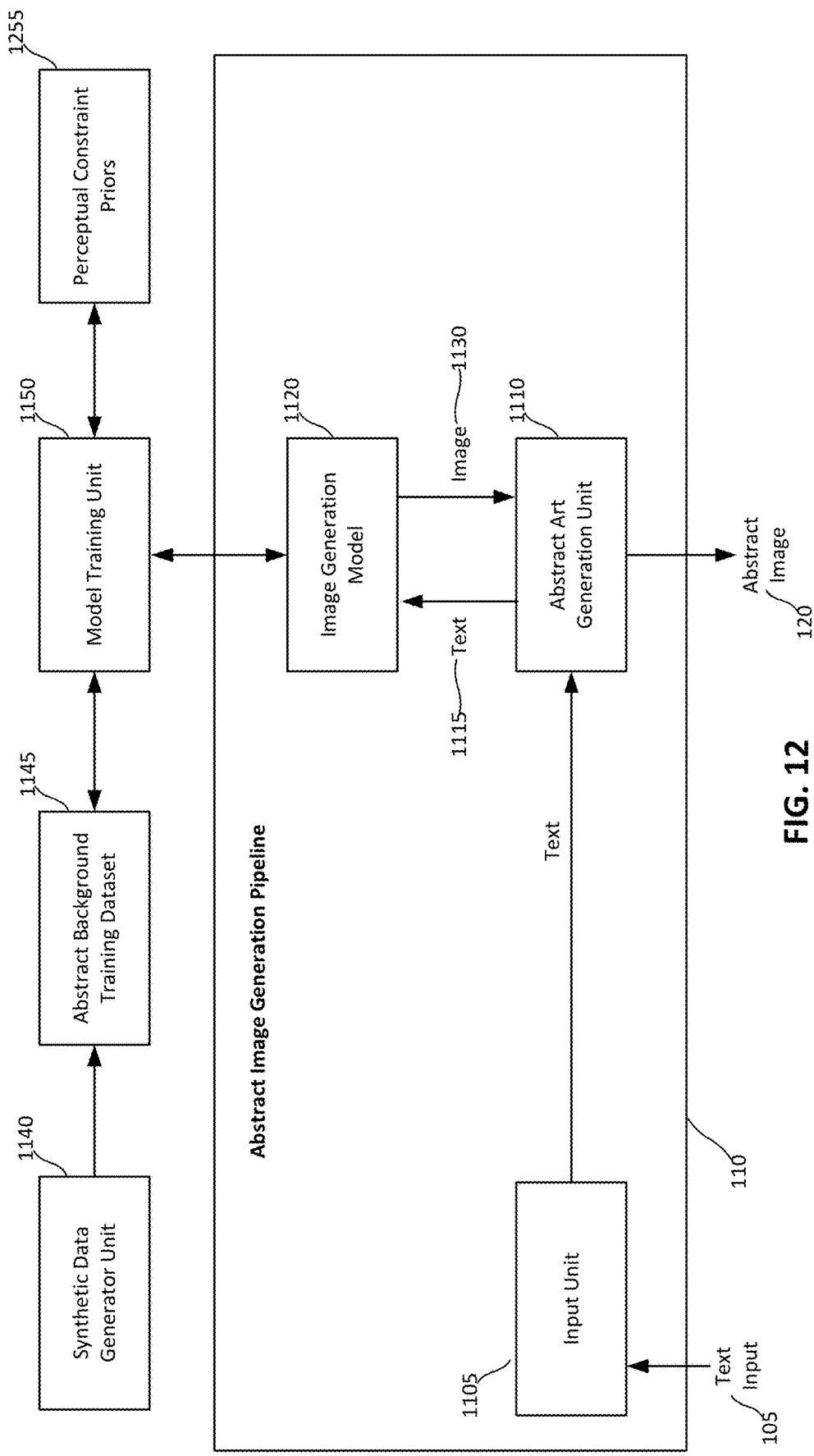

FIG. 12 shows another example implementation of the abstract image generation pipeline 110 shown in FIG. 11. In the example shown in FIG. 11, the model training unit 1150 includes perceptual constraint priors 1255 to enforce perceptual constraints on the abstract image 120 output by the abstract image generation pipeline 110. The perceptual constraints may include but are not limited to texture to apply to the abstract image 120, the uniformity of the texture to be applied to the abstract image 120, restrictions on the content of the abstract image to specified morphological space, restrictions to a specific geometry, and/or other such constraints. The perceptual constraints may be used to impose limits on how the abstract image 120 should look. In a non-limiting example, the perceptual constraints constrain the image generation model 1120 to output uniform patterns. A technical benefit of this approach is that the perceptual constraints can be defined to reduce the risk that the image generation model 1120 may generate inappropriate or objectionable content.

Figure 13:
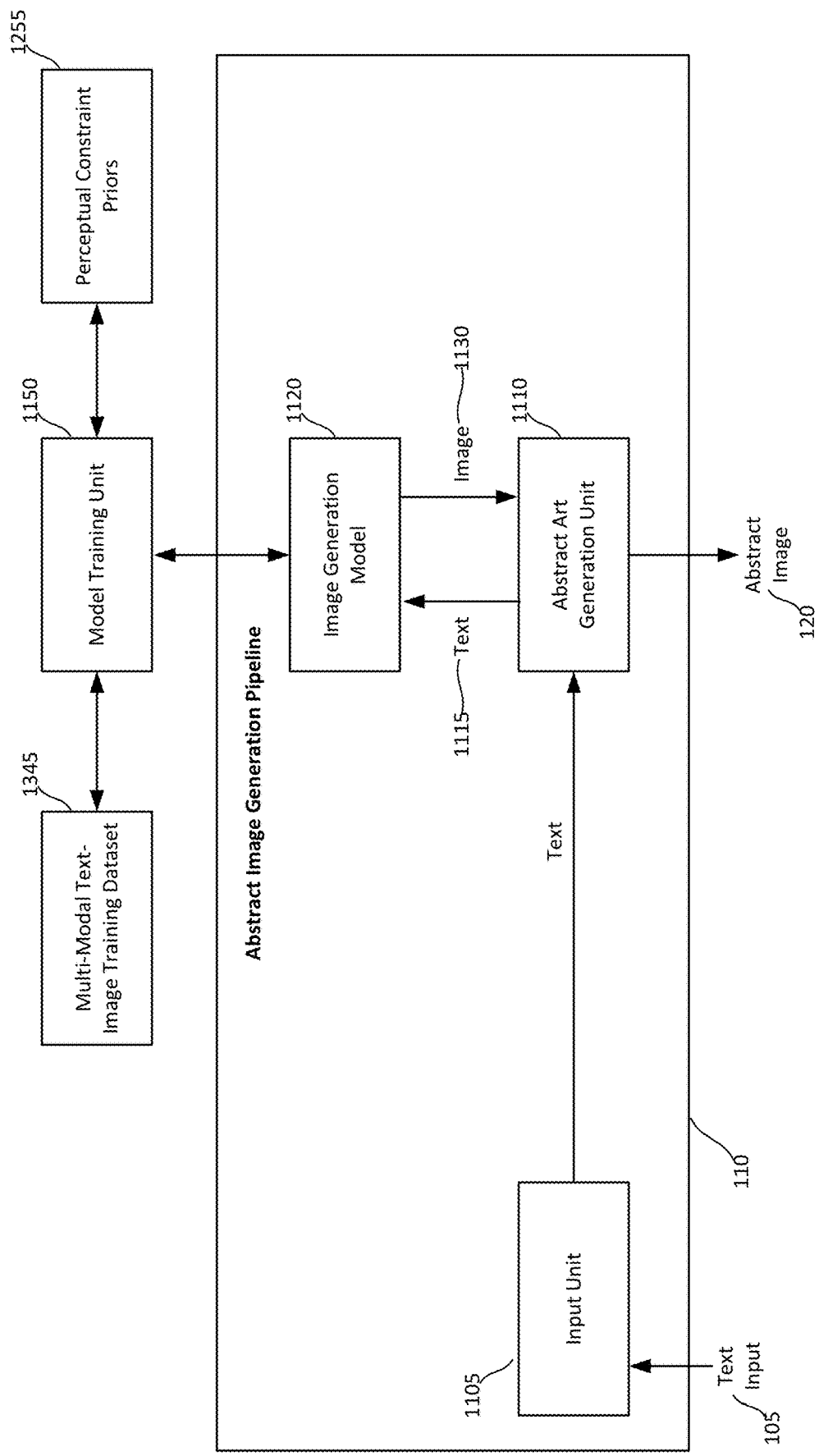

FIG. 13 shows another example implementation of the abstract image generation pipeline shown in FIGS. 11 and 12. In the example implementation shown in FIG. 13, the synthetic data generator unit 1140 and the abstract background training dataset 1145 have been omitted. The model training unit 1250 instead trains the image generation model 1220 from a large multi-modal text-image training dataset 1345. The text-image training dataset 1345 includes text and image pairs that may be used to train the image generation model 1220. The imagery included in the text-image training dataset 1345 is not limited to abstract image data as in the examples shown in FIGS. 11 and 12. Instead, the model training unit 1250 relies on the perceptual constraint priors 1255 to ensure that the abstract image 120 generated by the image generation model does not generate inappropriate or offensive content in contrast with models which have been trained using large image datasets which may include non-abstract imagery.

Figure 14:
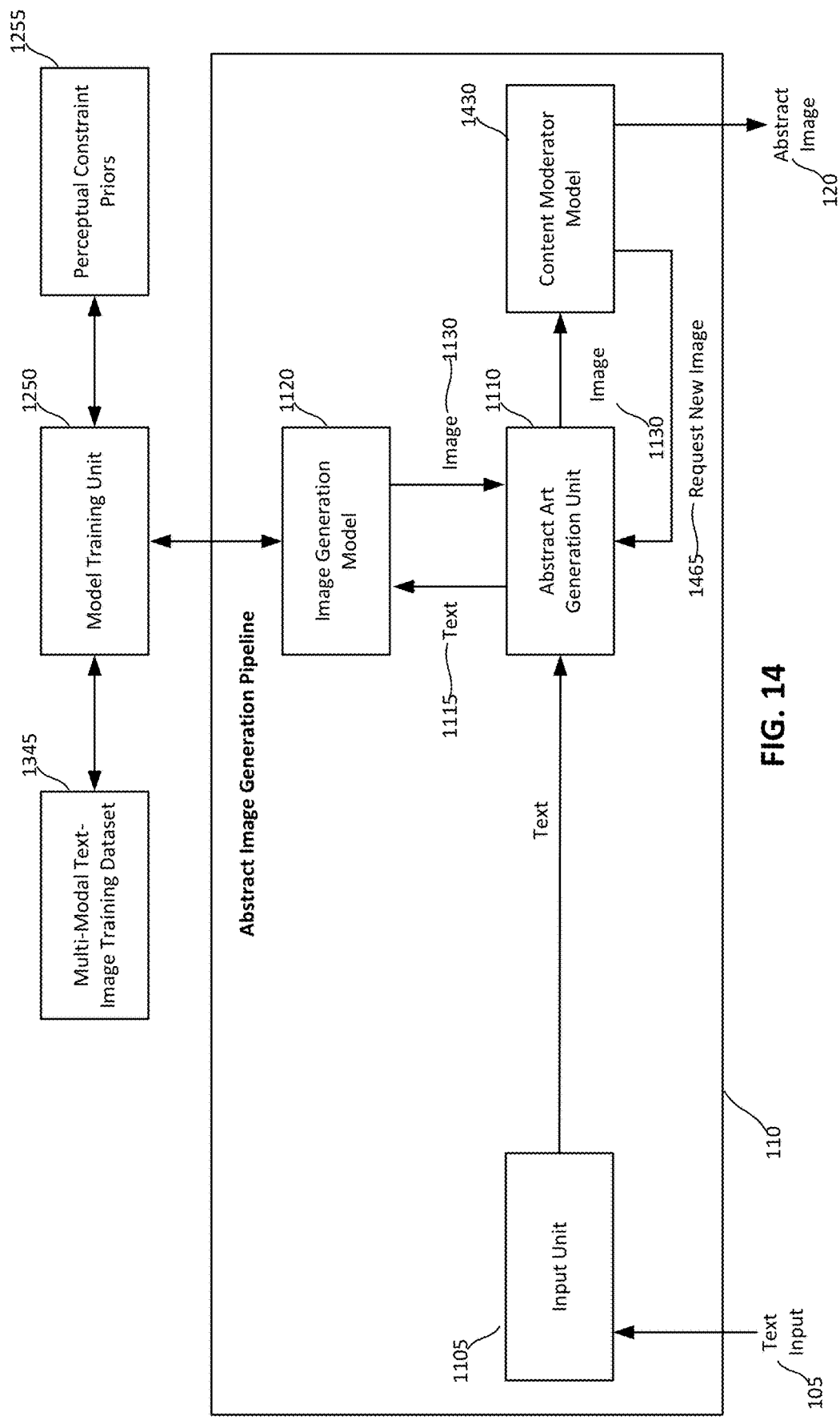

FIG. 14 shows another example of an implementation of the abstract image generation pipeline 110 show in FIGS. 11-13. The example implementation shown in FIG. 14 includes a content moderator model 1430. The abstract art generation unit 1110 provides the image 1110 output by the image generation model 1120 to the content moderator model 1430 for analysis. The content moderator model 1430 is a model that is trained to perform rejection sampling on the images output by the image generation model 1120. The content moderator model 1430 is trained as a discriminator model that analyzes the image 1130 and outputs an indication that the image 1130 should be discarded if the image is predicted to include objectionable or inappropriate content. If the discriminator model indicates that the image 1130 should be rejected, the model outputs an indication 1465 to the abstract art generation unit 1110, and the abstract art generation unit 1110 requests a new image from the image generation model 1120. Otherwise, if the content moderator model 1430 does not reject the image 1130, the content moderator model 1430 permits the image 1130 to be output as the abstract image 120. The content moderator model 1430 may be included in any of the previously described example implementations to determine whether the abstract image 120 generated in those implementations may be output or should be discarded and a new abstract image 120 generated.

Figure 15:
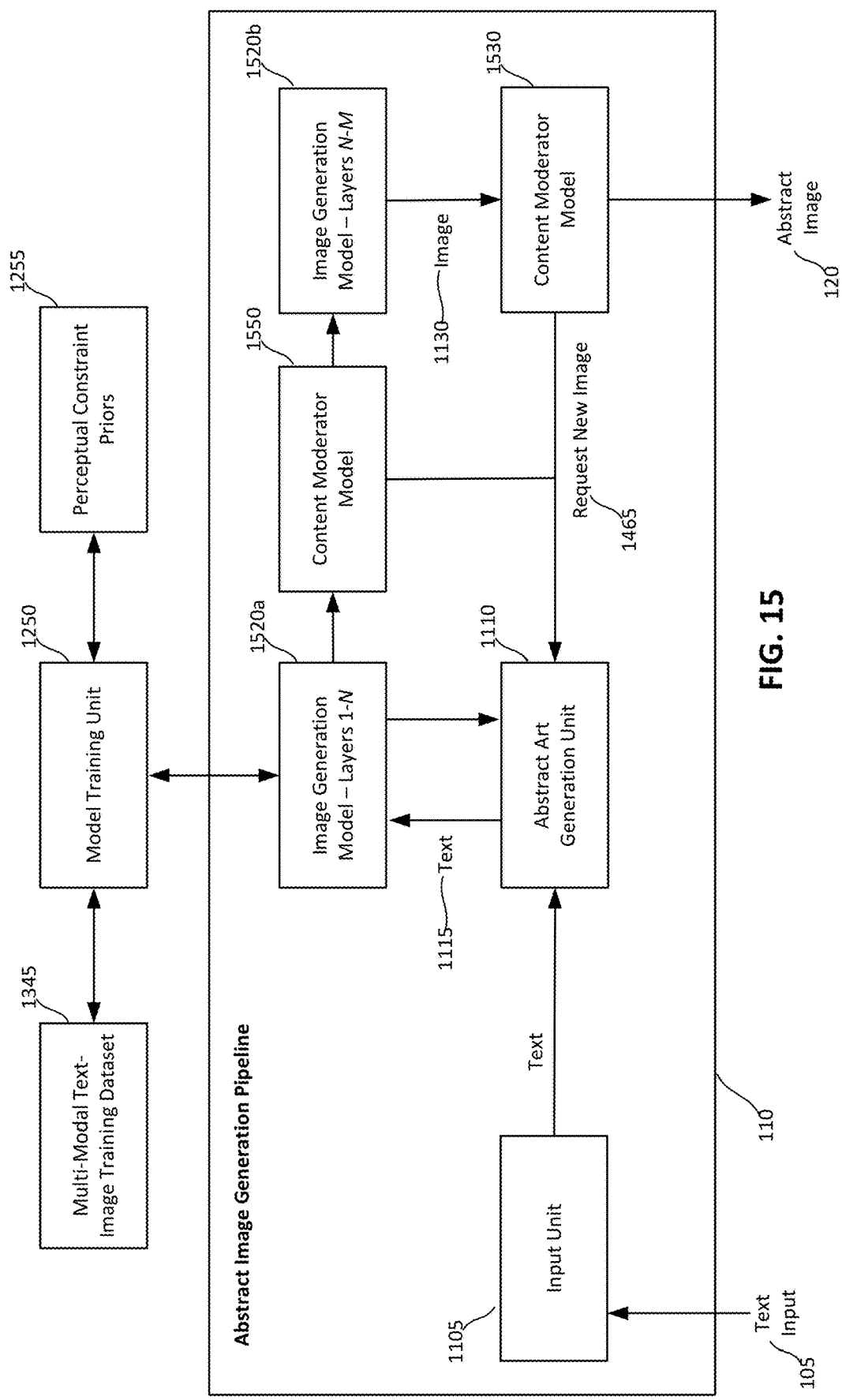

FIG. 15 shows another example of an implementation of the abstract image generation pipeline 110 shown in FIG. 14. The example implementation shown in FIG. 15 includes two content moderator models. The first content moderator model 1530 operates like the content moderator model 1430 shown in FIG. 14. The second content moderator model 1550 performs rejection sampling earlier in the process of generating the image 1130 using the image generation model 1520. The second content moderator model 1550 moderates intermediate feature representations of the image generation model 1520. In the example shown in FIG. 15, the second content moderator model moderates the intermediate feature representations generated by the first N layers of the image generation model 1520a as the model is processing the textual input 1115. If the content moderator model 1150 determines that the intermediate feature representations of the image generation model 1520 do not satisfy one or more latent space restrictions, the content moderator model 1550 can send a signal 1465 to the abstract art generation unit 1110 requesting a new image be generated. The second content moderator model 1550 may analyze a latent space associated with one layer of the or a concatenation of the latent spaces associated with multiple layers of the model. Otherwise, the remaining layers of image generation model 1520b can continue processing the textual input 1115, and the image 1130 output by the model is provided to the first content moderator model 1530 for analysis. The first content moderator model 1530 may determine that the image 1130 should be rejected and a request for new image 1430 can be provided to the abstract art generation unit 1110. Otherwise, the image 1130 is output as the abstract image 120.

A technical benefit of the second content moderator model 1550 is that it determine that the output of the model is not likely to satisfy the appropriateness considerations associated with the output of the image generation model 1520 earlier in the process of generating the image 1130. Consequently, this approach can reduce the amount of time as well as computing and memory resources associated with generating the image 1130 by stopping further processing by the image generation model 1520 when a problem is detected.

Figure 16:
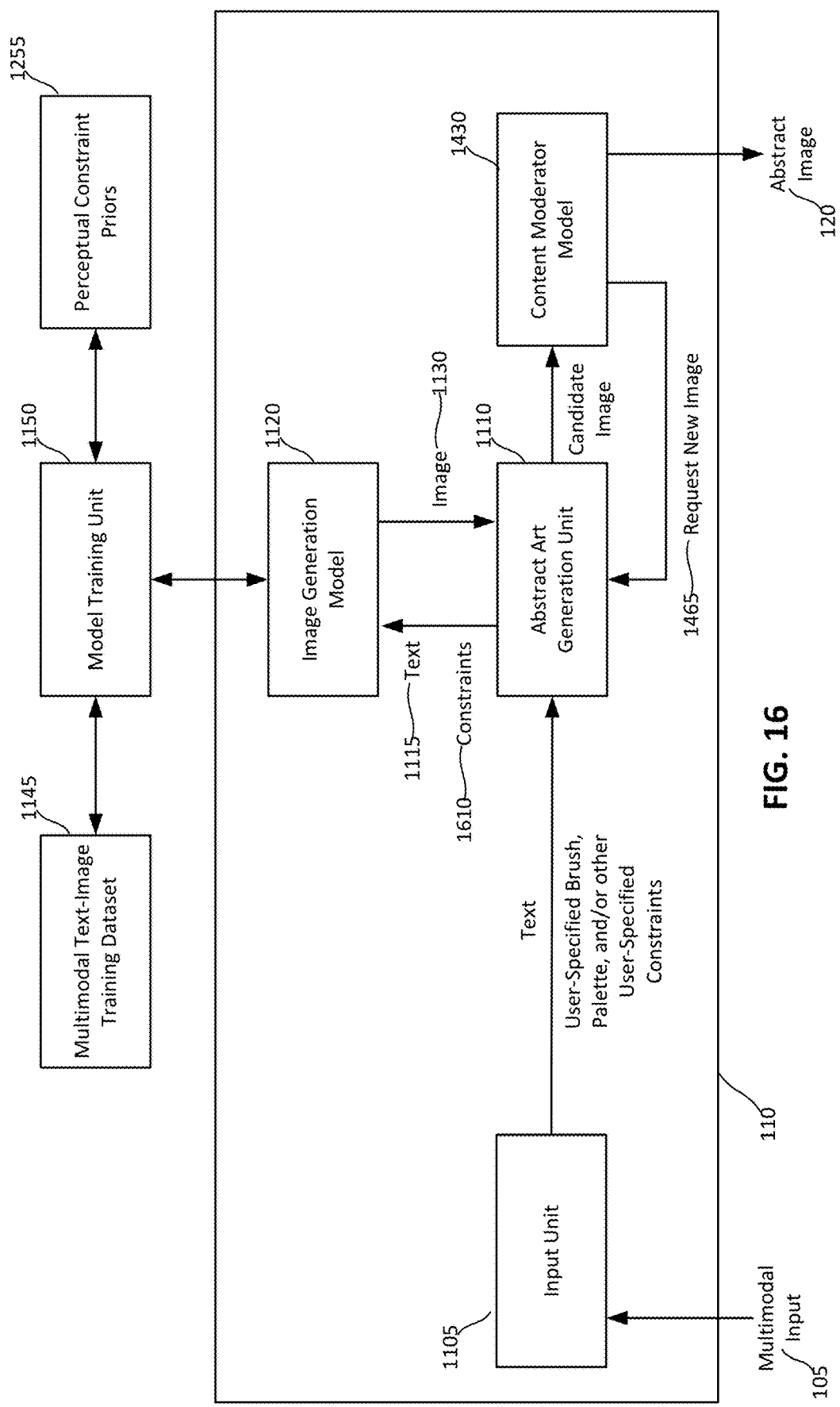

FIG. 16 shows another example of an implementation of the abstract image generation pipeline 110. In the example implementation of the abstract image generation pipeline 110 shown in FIG. 16, the multimodal input 105 includes user-specified constraints. The user-specified constraints include constraints that the user would like to apply to the generation process. For example, the user-specified constraints may specify a type of brush stroke, color palette, geometric shapes, and/or other such constraints that may be applied to the image generation model 1120 when generating the image 1130. These constraints may also be utilized in any of the preceding examples to constrain attributes of the abstract image 120.

Figure 17:
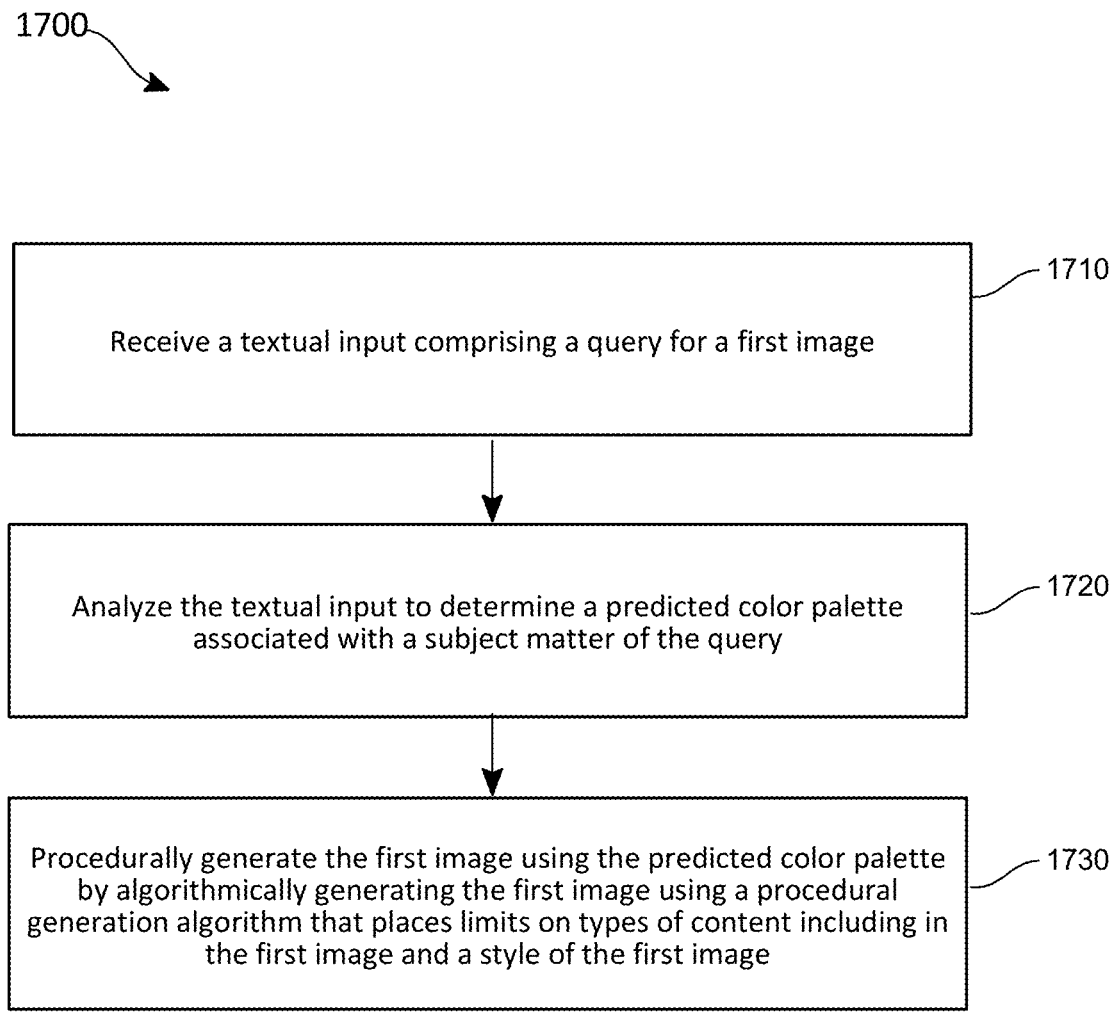
FIG. 17 is a flow diagram of a process for generating an abstract image according to the techniques described herein.

FIG. 17 is a flow diagram of a process 1700 for generating an abstract image according to the techniques described herein. The abstract image generation pipeline 110 shown in the preceding examples may implement the process 1700.

The process 1700 includes an operation 1710 of receiving a textual input comprising a query for a first image. As discussed in the preceding examples, the user may provide a text-based query that provides the basis for generating the abstract image 120.

The process 1700 includes an operation 1720 of analyzing the textual input to determine a predicted color palette associated with a subject matter of the query. As discussed in the preceding examples, the predicted color palette may be generated by a machine learning model trained to analyze the query text or by extracting the color palette information from a sample image.

The process 1700 includes an operation 1730 of procedurally generating the first image using the predicted color palette by algorithmically generating the first image using a procedural generation algorithm that places limits on types of content including in the first image and a style of the first image. Procedurally generating the first image using the predicted color palette by algorithmically generating the first image using an algorithm ensures that content appropriateness considerations associated with the first image are satisfied. As discussed in the preceding examples, the appropriateness considerations place limits on the types of content that may be included in the abstract image and the style of the abstract image. The abstract art generation unit of the abstract image generation pipeline 110 generates the abstract image 120 using the color palette determined based on the query text itself or extracted from the sample image obtained from a search engine or database.

Figure 18:
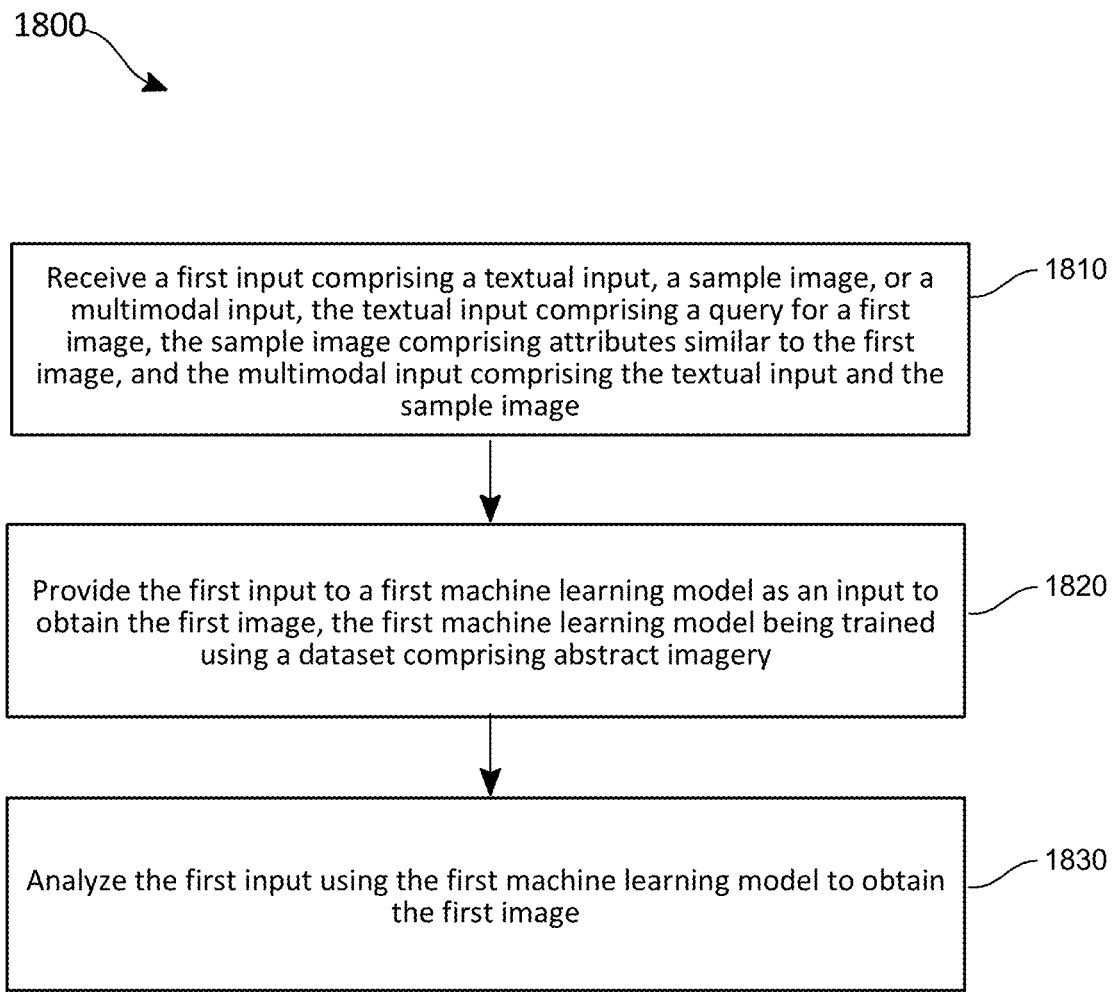
FIG. 18 is a flow diagram of another process for generating an abstract image according to the techniques described herein.

FIG. 18 is a flow diagram of another process 1800 for generating an image according to the techniques described herein. The abstract image generation pipeline 110 shown in the preceding examples may implement the process 1800.

The process 1800 includes an operation 1810 of receiving a first input comprising a textual input, a sample image, or a multimodal input. As discussed in the preceding examples, the user may provide a text-based query that provides the basis for generating the first image, a sample image that includes attributes similar to those of the first image, or a multimodal input that includes at least the text-based query and a sample image.

The process 1800 includes an operation 1820 of providing the first input using a first machine learning model to obtain the first image. The first machine learning model is trained using a dataset comprising abstract imagery, such as the abstract image training dataset 1145.

The process 1800 includes an operation 1830 of analyzing the first input using the first machine learning model to obtain the first image. The image generation model is trained using abstract imagery to reduce the likelihood that the model may generate an abstract image that includes objectionable or inappropriate content.

The detailed examples of systems, devices, and techniques described in connection with FIGS. 1-18 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-18 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 19:
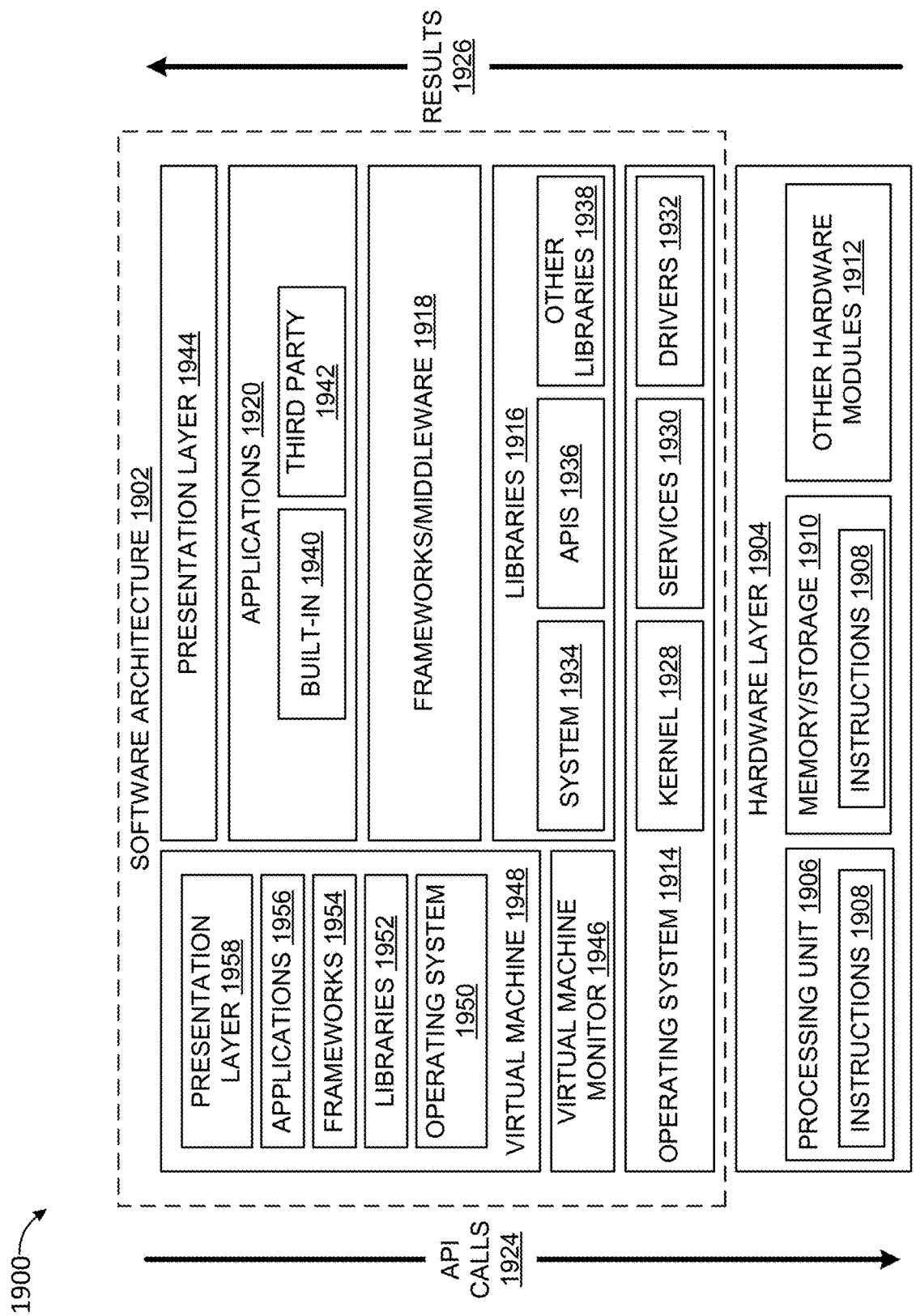
FIG. 19 is a block diagram showing an example software architecture, various portions of which may be used in conjunction with various hardware architectures herein described, which may implement any of the described features.

FIG. 19 is a block diagram 1900 illustrating an example software architecture 1902, various portions of which may be used in conjunction with various hardware architectures herein described, which may implement any of the above-described features. FIG. 19 is a non-limiting example of a software architecture, and it will be appreciated that many other architectures may be implemented to facilitate the functionality described herein. The software architecture 1902 may execute on hardware such as a machine 1900 of FIG. 20 that includes, among other things, processors 2010, memory 2030, and input/output (I/O) components 2050. A representative hardware layer 1904 is illustrated and can represent, for example, the machine 2000 of FIG. 20. The representative hardware layer 1904 includes a processing unit 1906 and associated executable instructions 1908. The executable instructions 1908 represent executable instructions of the software architecture 1902, including implementation of the methods, modules and so forth described herein. The hardware layer 1904 also includes a memory/storage 1910, which also includes the executable instructions 1908 and accompanying data. The hardware layer 1904 may also include other hardware modules 1912. Instructions 1908 held by processing unit 1906 may be portions of instructions 1908 held by the memory/storage 1910.

The example software architecture 1902 may be conceptualized as layers, each providing various functionality. For example, the software architecture 1902 may include layers and components such as an operating system (OS) 1914, libraries 1916, frameworks 1918, applications 1920, and a presentation layer 1944. Operationally, the applications 1920 and/or other components within the layers may invoke API calls 1924 to other layers and receive corresponding results 1926. The layers illustrated are representative in nature and other software architectures may include additional or different layers. For example, some mobile or special purpose operating systems may not provide the frameworks/middleware 1918.

The OS 1914 may manage hardware resources and provide common services. The OS 1914 may include, for example, a kernel 1928, services 1930, and drivers 1932. The kernel 1928 may act as an abstraction layer between the hardware layer 1904 and other software layers. For example, the kernel 1928 may be responsible for memory management, processor management (for example, scheduling), component management, networking, security settings, and so on. The services 1930 may provide other common services for the other software layers. The drivers 1932 may be responsible for controlling or interfacing with the underlying hardware layer 1904. For instance, the drivers 1932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1916 may provide a common infrastructure that may be used by the applications 1920 and/or other components and/or layers. The libraries 1916 typically provide functionality for use by other software modules to perform tasks, rather than rather than interacting directly with the OS 1914. The libraries 1916 may include system libraries 1934 (for example, C standard library) that may provide functions such as memory allocation, string manipulation, file operations. In addition, the libraries 1916 may include API libraries 1936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1916 may also include a wide variety of other libraries 1938 to provide many functions for applications 1920 and other software modules.

The frameworks 1918 (also sometimes referred to as middleware) provide a higher-level common infrastructure that may be used by the applications 1920 and/or other software modules. For example, the frameworks 1918 may provide various graphic user interface (GUI) functions, high-level resource management, or high-level location services. The frameworks 1918 may provide a broad spectrum of other APIs for applications 1920 and/or other software modules.

The applications 1920 include built-in applications 1940 and/or third-party applications 1942. Examples of built-in applications 1940 may include, but are not limited to, a contacts application, a browser application, a location application, a media application, a messaging application, and/or a game application. Third-party applications 1942 may include any applications developed by an entity other than the vendor of the particular platform. The applications 1920 may use functions available via OS 1914, libraries 1916, frameworks 1918, and presentation layer 1944 to create user interfaces to interact with users.

Some software architectures use virtual machines, as illustrated by a virtual machine 1948. The virtual machine 1948 provides an execution environment where applications/modules can execute as if they were executing on a hardware machine (such as the machine 2000 of FIG. 20, for example). The virtual machine 1948 may be hosted by a host OS (for example, OS 1914) or hypervisor, and may have a virtual machine monitor 1946 which manages operation of the virtual machine 1948 and interoperation with the host operating system. A software architecture, which may be different from software architecture 1902 outside of the virtual machine, executes within the virtual machine 1948 such as an OS 1950, libraries 1952, frameworks 1954, applications 1956, and/or a presentation layer 1958.

Figure 20:
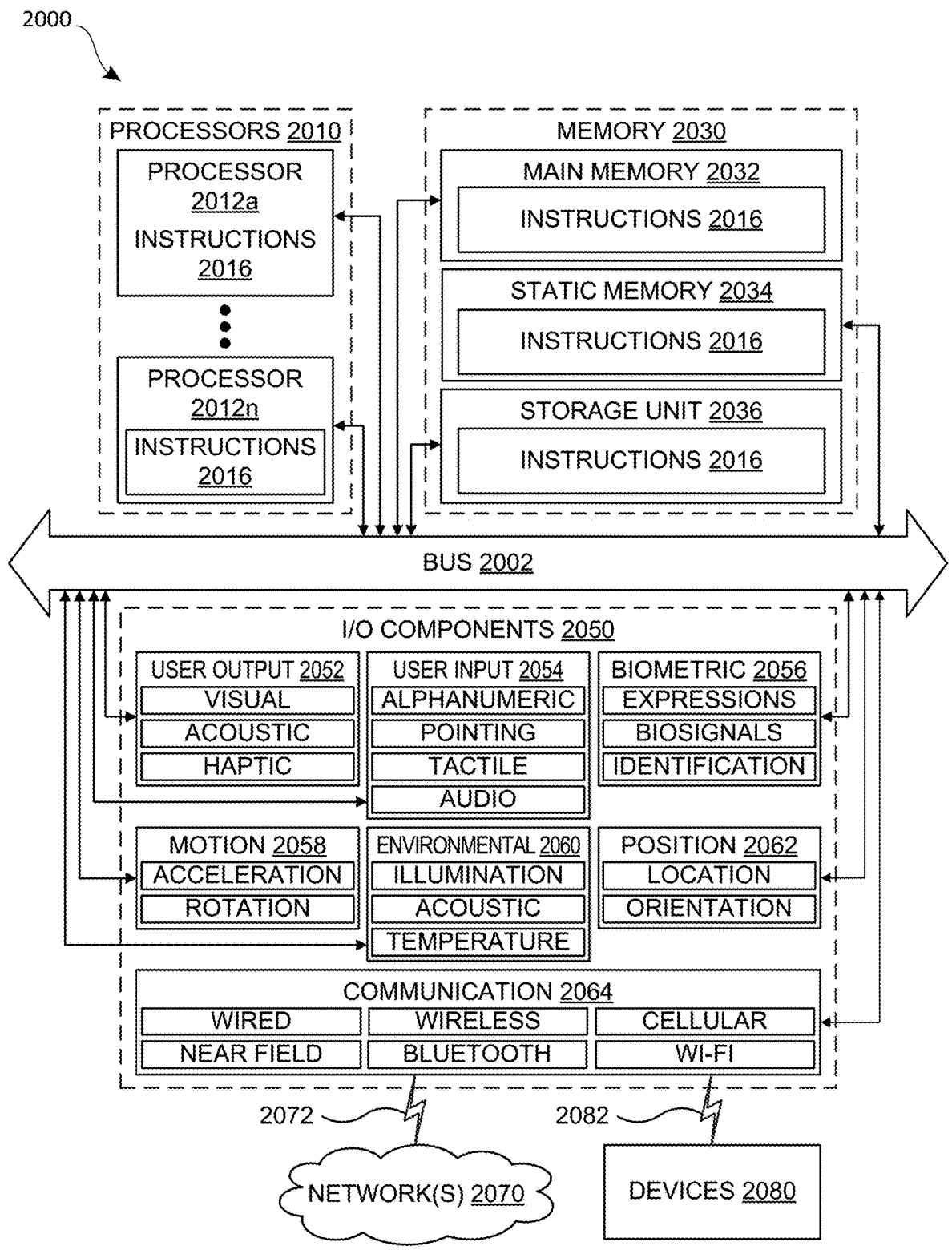
FIG. 20 is a block diagram showing components of an example machine configured to read instructions from a machine-readable medium and perform any of the features described herein.

FIG. 20 is a block diagram illustrating components of an example machine 2000 configured to read instructions from a machine-readable medium (for example, a machine-readable storage medium) and perform any of the features described herein. The example machine 2000 is in a form of a computer system, within which instructions 2016 (for example, in the form of software components) for causing the machine 2000 to perform any of the features described herein may be executed. As such, the instructions 2016 may be used to implement modules or components described herein. The instructions 2016 cause unprogrammed and/or unconfigured machine 2000 to operate as a particular machine configured to carry out the described features. The machine 2000 may be configured to operate as a standalone device or may be coupled (for example, networked) to other machines. In a networked deployment, the machine 2000 may operate in the capacity of a server machine or a client machine in a server-client network environment, or as a node in a peer-to-peer or distributed network environment. Machine 2000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2000 is illustrated, the term "machine" includes a collection of machines that individually or jointly execute the instructions 2016.

The machine 2000 may include processors 2010, memory 2030, and I/O components 2050, which may be communicatively coupled via, for example, a bus 2002. The bus 2002 may include multiple buses coupling various elements of machine 2000 via various bus technologies and protocols. In an example, the processors 2010 (including, for example, a central processing unit (CPU), a graphics processing unit (GPU), a digital signal processor (DSP), an ASIC, or a suitable combination thereof) may include one or more processors 2012a to 2012n that may execute the instructions 2016 and process data. In some examples, one or more processors 2010 may execute instructions provided or identified by one or more other processors 2010. The term "processor" includes a multi-core processor including cores that may execute instructions contemporaneously. Although FIG. 20 shows multiple processors, the machine 2000 may include a single processor with a single core, a single processor with multiple cores (for example, a multi-core processor), multiple processors each with a single core, multiple processors each with multiple cores, or any combination thereof. In some examples, the machine 2000 may include multiple processors distributed among multiple machines.

The memory/storage 2030 may include a main memory 2032, a static memory 2034, or other memory, and a storage unit 2036, both accessible to the processors 2010 such as via the bus 2002. The storage unit 2036 and memory 2032, 2034 store instructions 2016 embodying any one or more of the functions described herein. The memory/storage 2030 may also store temporary, intermediate, and/or long-term data for processors 2010. The instructions 2016 may also reside, completely or partially, within the memory 2032, 2034, within the storage unit 2036, within at least one of the processors 2010 (for example, within a command buffer or cache memory), within memory at least one of I/O components 2050, or any suitable combination thereof, during execution thereof. Accordingly, the memory 2032, 2034, the storage unit 2036, memory in processors 2010, and memory in I/O components 2050 are examples of machine-readable media.

As used herein, "machine-readable medium" refers to a device able to temporarily or permanently store instructions and data that cause machine 2000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2016) for execution by a machine 2000 such that the instructions, when executed by one or more processors 2010 of the machine 2000, cause the machine 2000 to perform and one or more of the features described herein.

Accordingly, a "machine-readable medium" may refer to a single storage device, as well as "cloud-based" storage systems or storage networks that include multiple storage apparatus or devices. The term "machine-readable medium" excludes signals per se.

The I/O components 2050 may include a wide variety of hardware components adapted to receive input, provide output, produce output, transmit information, exchange information, capture measurements, and so on. The specific I/O components 2050 included in a particular machine will depend on the type and/or function of the machine. For example, mobile devices such as mobile phones may include a touch input device, whereas a headless server or IoT device may not include such a touch input device. The particular examples of I/O components illustrated in FIG. 20 are in no way limiting, and other types of components may be included in machine 2000. The grouping of I/O components 2050 are merely for simplifying this discussion, and the grouping is in no way limiting. In various examples, the I/O components 2050 may include user output components 2052 and user input components 2054. User output components 2052 may include, for example, display components for displaying information (for example, a liquid crystal display (LCD) or a projector), acoustic components (for example, speakers), haptic components (for example, a vibratory motor or force-feedback device), and/or other signal generators. User input components 2054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2050 may include biometric components 2056, motion components 2058, environmental components 2060, and/or position components 2062, among a wide array of other physical sensor components. The biometric components 2056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2058 may include, for example, acceleration sensors (for example, an accelerometer) and rotation sensors (for example, a gyroscope). The environmental components 2060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2062 may include, for example, location sensors (for example, a Global Position System (GPS) receiver), altitude sensors (for example, an air pressure sensor from which altitude may be derived), and/or orientation sensors (for example, magnetometers).

The I/O components 2050 may include communication components 2064, implementing a wide variety of technologies operable to couple the machine 2000 to network(s) 2070 and/or device(s) 2080 via respective communicative couplings 2072 and 2082. The communication components 2064 may include one or more network interface components or other suitable devices to interface with the network (s) 2070. The communication components 2064 may include, for example, components adapted to provide wired communication, wireless communication, cellular communication, Near Field Communication (NFC), Bluetooth communication, Wi-Fi, and/or communication via other modalities. The device(s) 2080 may include other machines or various peripheral devices (for example, coupled via USB).

In some examples, the communication components 2064 may detect identifiers or include components adapted to detect identifiers. For example, the communication components 2064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a machine-readable medium storing executable instructions that, when executed, cause the processor to perform operations comprising:
        receiving a textual input comprising a query for a first image;
        analyzing the textual input to determine a predicted color palette associated with a subject matter of the query by:
            providing the textual input to a first machine learning model, the first machine learning model trained to analyze the textual input and to output a predicted color palette length, the predicted color palette length predicting a number of colors to represent a subject matter of the query based on a complexity of the query; and
            analyzing the textual input with the first machine learning model to obtain the predicted color palette length; and
        procedurally generating the first image using the predicted color palette by algorithmically generating the first image using a procedural generation algorithm that places limits on types of content to be included in the first image and a style of the first image.

2. The data processing system of claim 1, wherein the first image is an abstract image, the abstract image comprising an image based on shapes, pattern, texture, color, or combination thereof, the abstract image excluding a representation of people, animals, object, features, or other aspects of a physical world.

3. The data processing system of claim 1, wherein procedurally generating the first image comprises:
    analyzing the textual input using the procedural generation algorithm, the procedural generation algorithm implementing a set of actions for analyzing the textual input to determine features of the first image and for generating the first image based on the features.

4. The data processing system of claim 1, wherein generating the predicted color palette for the first image further comprises:
    submitting the textual input to a search engine to obtain a sample image based on the query; and
    analyzing the sample image to extract predicted color palette information from the sample image.

5. The data processing system of claim 1, wherein generating the predicted color palette for the first image further comprises:
    providing the textual input to a second machine learning model, the second machine learning model trained to analyze the textual input and to output a predicted color palette associated with a subject matter of the query; and
    analyzing the textual input with the second machine learning model to obtain the predicted color palette for the first image.

6. The data processing system of claim 5, wherein the first machine learning model is trained to predict a number of colors to include in the predicted color palette and a color diversity associated with the predicted color palette based on the textual input.

7. The data processing system of claim 5,
    wherein providing the textual input to the second machine learning model further comprises providing the textual input and the predicted color palette length to obtain the predicted color palette.

8. A data processing system comprising:
    a processor; and
    a machine-readable medium storing executable instructions that, when executed, cause the processor to perform operations comprising:
        receiving a textual input comprising a query for a first image;
        providing the textual input to a first machine learning model, the first machine learning model configured to output a mood and sentiment prediction based on the textual input, wherein mood represents a mental or emotional state conveyed by the textual input, and wherein sentiment represents an emotional assessment of the textual input;
        analyzing the textual input with the first machine learning model to obtain the mood and sentiment prediction;
        analyzing the textual input to determine a predicted color palette associated with a subject matter of the query by:
            providing the textual input and the mood and sentiment prediction to a second machine learning model, the second machine learning model trained to analyze the textual input and the mood and sentiment prediction and to output a predicted color palette associated with a subject matter of the query; and analyzing the textual input and the mood and sentiment prediction with the second machine learning model to obtain the predicted color palette for the first image; and procedurally generating the first image using the predicted color palette by algorithmically generating the first image using a procedural generation algorithm that places limits on types of content to be included in the first image and a style of the first image.

9. A data processing system comprising:

a processor; and a machine-readable medium storing executable instructions that, when executed, cause the processor to perform operations comprising:

receiving a textual input comprising a query for a first image;

analyzing the textual input to determine a predicted color palette associated with a subject matter of the query;

providing the textual input to a first machine learning model, the first machine learning model being configured to analyze textual content and to output executable program code for generating the first image;

analyzing the textual input with the first machine learning model to obtain the executable program code for generating the first image; and procedurally generating, by executing the executable program code, the first image using the predicted color palette, the executable program code algorithmically generating the first image using a procedural generation algorithm that places limits on types of content to be included in the first image and a style of the first image.

10. A data processing system comprising:

a processor; and a machine-readable medium storing executable instructions that, when executed, cause the processor to perform operations comprising:

receiving a textual input comprising a query for a first image and a sample image;

analyzing the textual input to determine a predicted color palette associated with a subject matter of the query;

providing the sample image to a first machine learning model, the first machine learning model being configured to analyze the sample image to determine stylistic attributes of the sample image and to output executable program code for generating the first image according to stylistic parameters of the sample image;

analyzing the sample image with the first machine learning model to obtain the executable program code for generating the first image; and procedurally generating, by executing the executable program code, the first image using the predicted color palette, the executable program code algorithmically generating the first image using a procedural generation algorithm that places limits on types of content including in the first image and a style of the first image.

11. A data processing system comprising:

a processor; and a machine-readable medium storing executable instructions that, when executed, cause the processor to perform operations comprising:

receiving a plurality of first textual inputs comprising a query for an abstract image;

analyzing each respective textual input of the plurality of first textual inputs to determine a predicted color palette associated with a subject matter of the query;

procedurally generating a respective abstract image using the predicted color palette for each respective textual input of the plurality of first textual inputs;

generating a dataset used to train a first machine learning model by pairing each respective textual input of the plurality of first textual inputs with the respective abstract image generated for the respective textual input;

training the first machine learning model using the dataset comprising abstract imagery;

receiving a second input comprising a textual input, a sample image, or a multimodal input, the textual input comprising a query for a first image, the sample image comprising attributes similar to the first image, and the multimodal input comprising the textual input and the sample image;

providing the second input to the first machine learning model as an input to obtain the first image; and analyzing the second input using the first machine learning model to obtain the first image.

12. The data processing system of claim 11, wherein the first image is an abstract image, the abstract image comprising an image based on shapes, pattern, texture, color, or combination thereof, the abstract image excluding a representation of people, animals, object, features, or other aspects of a physical word.

13. The data processing system of claim 11, wherein the machine-readable medium includes instructions configured to cause the processor to perform operations of:

obtaining perceptual constraint information that defines limits on properties of the abstract image generated by the first machine learning model; and training the first machine learning model with the perceptual constraint information to constrain the properties of abstract images output by the first machine learning model.

14. The data processing system of claim 11, wherein the machine-readable medium includes instructions configured to cause the processor to perform operations of:

providing the abstract image as an input to a second machine learning model, the second machine learning model configured to analyze an image and to output an indication whether the abstract image potentially contains objectionable or inappropriate content;

analyzing the abstract image with the second machine learning model to obtain the indication; and discarding the abstract image responsive to the second machine learning model outputting an indication that abstract image potentially contains objectionable or inappropriate content.

15. The data processing system of claim 11, wherein the machine-readable medium includes instructions configured to cause the processor to perform operations of:

receiving user-specified constraints with the second input, the user-specified constraints defining limits on properties of the abstract image generated by the first machine learning model; and providing the user-specified constraints as an input to the first machine learning model.

16. A data processing system comprising:

a processor; and a machine-readable medium storing executable instructions that, when executed, cause the processor to perform operations comprising:

receiving a first input comprising a textual input, a sample image, or a multimodal input, the textual input comprising a query for a first image, the sample image comprising attributes similar to the first image, and the multimodal input comprising the textual input and the sample image;

providing the first input to a first machine learning model as an input to obtain the first image, the first machine learning model being trained using a dataset comprising abstract imagery; and analyzing the first input using the first machine learning model to obtain the first image, wherein analyzing the first input includes:

analyzing intermediate feature representations of the first machine learning model using a second machine learning model, the second machine learning model being trained to receive a representation of the intermediate feature representations as an input and to output a prediction whether the first machine learning model will output an abstract image that includes objectionable or inappropriate content;

analyzing the intermediate feature representations generated by the first machine learning model to obtain the prediction; and halting processing of first machine learning model before the first machine learning model generates the abstract image in response to the prediction indicating that the abstract image being generated by the first machine learning model includes objectionable or inappropriate content.

17. A method implemented in a data processing system for generating an image, the method comprising:

receiving a textual input comprising a query for a first image;

analyzing the textual input to determine a predicted color palette associated with a subject matter of the query by:

providing the textual input to a first machine learning model, the first machine learning model trained to analyze the textual input and to output a predicted color palette length, the predicted color palette length predicting a number of colors to represent a subject matter of the query based on a complexity of the query; and analyzing the textual input with the first machine learning model to obtain the predicted color palette length; and procedurally generating the first image using the predicted color palette by algorithmically generating the first image using a procedural generation algorithm that places limits on types of content including in the first image and a style of the first image.

18. The method of claim 17, wherein the first image is an abstract image, the abstract image comprising an image based on shapes, pattern, texture, color, or combination thereof, the abstract image excluding a representation of people, animals, object, features, or other aspects of a physical word.

19. The method of claim 17, wherein generating the predicted color palette for the first image further comprises:

submitting the textual input to a search engine to obtain a sample image based on the query; and analyzing the sample image to extract predicted color palette information from the sample image.

20. The method of claim 17, wherein generating the predicted color palette for the first image further comprises:

providing the textual input to a second machine learning model, the second machine learning model trained configured to analyze a textual query and to output a predicted color palette associated with the subject matter the query; and analyzing the textual input with the second machine learning model to obtain the predicted color palette for the first image.

21. The method of claim 20, wherein the first machine learning model is trained to predict a number of colors to include in the predicted color palette and a color diversity associated with the predicted color palette based on the textual input.

22. The method of claim 20, wherein providing the textual input to the second machine learning model further comprises providing the textual input and the predicted color palette length to obtain the predicted color palette.

23. A method implemented in a data processing system for generating an image, the method comprising:

receiving a textual input comprising a query for a first image;

providing the textual input to a first machine learning model, the first machine learning model configured to output a mood and sentiment prediction based on the textual input, wherein mood represents a mental or emotional state conveyed by the textual input, and wherein sentiment represents an emotional assessment of the textual input;

analyzing the textual input with the first machine learning model to obtain the mood and sentiment prediction;

analyzing the textual input to determine a predicted color palette associated with a subject matter of the query by:

providing the textual input and the mood and sentiment prediction to a second machine learning model, the second machine learning model trained to analyze the textual input and the mood and sentiment prediction and to output a predicted color palette associated with a subject matter of the query; and analyzing the textual input and the mood and sentiment prediction with the second machine learning model to obtain the predicted color palette for the first image; and procedurally generating the first image using the predicted color palette by algorithmically generating the first image using a procedural generation algorithm that places limits on types of content to be included in the first image and a style of the first image.

* * * * *